US011060621B2

(12) United States Patent
DeSalvo et al.

(10) Patent No.: US 11,060,621 B2
(45) Date of Patent: Jul. 13, 2021

(54) ELECTROMAGNETICALLY ACTUATED FLUIDIC-DEVICE VALVE APPARATUSES, SYSTEMS, AND METHODS

(71) Applicant: Facebook Technologies, LLC, Menlo Park, CA (US)

(72) Inventors: Riccardo DeSalvo, Pasadena, CA (US); Xavier Clark Talbot-Thiebaux, North Hollywood, CA (US); Matthew Schwab, Pasadena, CA (US); Ian Andreas Marquez, Whittier, CA (US); Jack Lindsay, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 77 days.

(21) Appl. No.: 16/114,151

(22) Filed: Aug. 27, 2018

(65) Prior Publication Data

US 2020/0063876 A1 Feb. 27, 2020

(51) Int. Cl.
| | |
|---|---|
| *F16K 11/07* | (2006.01) |
| *F16K 31/122* | (2006.01) |
| *G06F 3/0346* | (2013.01) |
| *G06F 3/01* | (2006.01) |
| *F16K 31/08* | (2006.01) |
| *F16K 31/06* | (2006.01) |

(52) U.S. Cl.
CPC .......... *F16K 11/0708* (2013.01); *F16K 11/07* (2013.01); *F16K 11/0716* (2013.01); *F16K 31/0613* (2013.01); *F16K 31/0679* (2013.01); *F16K 31/082* (2013.01); *F16K 31/1221* (2013.01); *G06F 3/014* (2013.01); *G06F 3/016* (2013.01); *G06F 3/0346* (2013.01); *F16K 31/0693* (2013.01); *G06F 3/011* (2013.01)

(58) Field of Classification Search
CPC .. F16K 11/0708; F16K 11/0716; F16K 11/07; F16K 31/0679; F16K 31/0613; F16K 31/082; F16K 31/1221; F16K 31/0693; G06F 3/0346; G06F 3/014; G06F 3/016; G06F 3/011
See application file for complete search history.

(56) References Cited

U.S. PATENT DOCUMENTS

| | | | | |
|---|---|---|---|---|
| 2,983,285 A | * | 5/1961 | Gardner | F16K 31/0613 137/625.65 |
| 4,574,843 A | * | 3/1986 | Loup | F16K 31/0613 137/625.64 |

(Continued)

*Primary Examiner* — Jessica Cahill
*Assistant Examiner* — Patrick C Williams
(74) *Attorney, Agent, or Firm* — FisherBroyles, LLP

(57) ABSTRACT

A fluidic-device valve may include a valve guide having a guide wall surrounding a central axis. The guide wall may include a first guide section, a second guide section, and an interior surface that defines a valve cavity extending longitudinally along the central axis from the first guide section to the second guide section. The valve may also include a valve member having a ferromagnetic material disposed within the valve cavity, and the valve member may extend longitudinally along the central axis. The valve member may also have a first plug section and a second plug section and may define a fluid conduit between the first plug section and the second plug section. Various other methods, systems, and computer-readable media are also disclosed.

17 Claims, 21 Drawing Sheets

(56) References Cited

U.S. PATENT DOCUMENTS

| | | | | |
|---|---|---|---|---|
| 5,143,287 | A * | 9/1992 | Jardinier | F24F 11/0001 |
| | | | | 236/49.3 |
| 6,474,353 | B1 * | 11/2002 | Sturman | F15B 13/044 |
| | | | | 137/1 |
| 8,225,818 | B1 * | 7/2012 | Stephens | F15B 13/0442 |
| | | | | 137/625.68 |
| 9,703,381 | B2 | 7/2017 | Gallo et al. | |
| 2004/0206922 | A1 * | 10/2004 | Du Plessis | F16K 31/0613 |
| | | | | 251/129.06 |
| 2017/0248249 | A1 * | 8/2017 | Kiltz | F16K 31/082 |
| 2019/0063619 | A1 | 2/2019 | Keller et al. | |

* cited by examiner

ELECTROMAGNETICALLY ACTUATED FLUIDIC-DEVICE VALVE APPARATUSES, SYSTEMS, AND METHODS

BACKGROUND

Augmented reality and virtual reality systems may use wearable devices (such as haptic gloves) to give users the perception that they are physically interacting with virtual objects. To make such wearable devices simpler, more effective, and/or less bulky, some artificial reality systems may use a system of fluidic devices within their wearable devices. The instant disclosure identifies and addresses a need for improved valve apparatuses, systems, and methods for selectively delivering pressurized fluids in fluidic systems (e.g., fluidic systems that operate within artificial reality systems).

SUMMARY

As will be described in greater detail below, the instant disclosure describes various valve apparatuses, systems, and methods for use in fluidic systems. In one example, a fluidic-device valve may include a valve guide having a guide wall surrounding a central axis. The guide wall may include a first guide section, a second guide section, and an interior surface that defines a valve cavity extending longitudinally along the central axis from the first guide section to the second guide section. The valve may also include a valve member having a ferromagnetic material disposed within the valve cavity, and the valve member may extend longitudinally along the central axis. The valve member may also have a first plug section and a second plug section and may define a fluid conduit between the first plug section and the second plug section.

The valve may also have (i) a first electromagnetic coil surrounding at least a portion of the first guide section of the guide wall such that the valve member is movable within the valve cavity in a first axial direction along the central axis to position the fluid conduit at a first location by applying a first electric current to the first electromagnetic coil and (ii) a second electromagnetic coil surrounding at least a portion of the second guide section of the guide wall such that the valve member is movable within the valve cavity in a second axial direction opposite the first axial direction to position the fluid conduit at a second location by applying a second electric current to the second electromagnetic coil.

In some embodiments, the first plug section of the valve member may abut the interior surface of the valve guide at the first guide section and the second plug section of the valve member may abuts the interior surface of the valve guide at the second guide section. Additionally or alternatively, the guide wall may further define (i) a central opening extending through a portion of the guide wall from the interior surface to an exterior of the guide wall, (ii) a first branch opening extending through a first additional portion of the guide wall from the interior surface to the exterior of the guide wall, and (iii) a second branch opening extending through a second additional portion of the guide wall from the interior surface to the exterior of the guide wall such that the central opening is in fluid communication with the first branch opening when the fluid conduit is positioned at the first location. In such embodiments, the central opening may be in fluid communication with the second branch opening when the fluid conduit is positioned at the second location.

According to certain embodiments, the second plug section of the valve member may block fluid flow through the second branch opening when the fluid conduit is positioned at the first location and the first plug section of the valve member may block fluid flow through the first branch opening when the fluid conduit is positioned at the second location. In some embodiments, a central line, a first branch line, and a second branch line may each be coupled to an exterior of the valve guide such that (i) the central opening is in fluid communication with the central line, (ii) the first branch opening is in fluid communication with the first branch line, and (iii) the second branch opening is in fluid communication with the second branch line.

In some embodiments, the value may include a first flux guide surrounding at least a portion of the first electromagnetic coil and a second flux guide surrounding at least a portion of the second electromagnetic coil. Additionally or alternatively, the application of the first electric current to the first electromagnetic coil may produce an electromagnetic field in the valve cavity that is oriented in the first axial direction and the application of the second electric current to the second electromagnetic coil may produce an electromagnetic field in the valve cavity that is oriented in the second axial direction. Furthermore, in certain embodiments, at least a portion of each of the first plug section and the second plug section of the valve member may include a substantially cylindrical outer surface corresponding to a substantially cylindrical shape of at least a portion of the interior surface of the guide wall.

According to certain embodiments, the fluid conduit defined by the valve member may include a circumferential groove surrounding the central axis. In at least one embodiment, the valve cavity may include a first end portion and a second end portion disposed axially opposite the first end portion along the central axis such that the first end portion is separated from the second end portion by the valve member. In such embodiments, the first end portion may be in fluid communication with the second end portion via a coupling passage located outside the valve cavity.

The fluidic-device valve described above may be included in a haptic device. For example, a haptic device may include a fluidic-device valve having (i) a valve guide that includes a guide wall surrounding a central axis (the guide wall may include a first guide section, a second guide section, and an interior surface that defines a valve cavity extending longitudinally along the central axis from the first guide section to the second guide section), (ii) a valve member having a ferromagnetic material disposed within the valve cavity (the valve member may extend longitudinally along the central axis and may include a first plug section and a second plug section and defining a fluid conduit between the first plug section and the second plug section), (iii) a first electromagnetic coil surrounding at least a portion of the first guide section of the guide wall such that the valve member is movable within the valve cavity in a first axial direction along the central axis to position the fluid conduit at a first location by applying a first electric current to the first electromagnetic coil, and (iv) a second electromagnetic coil surrounding at least a portion of the second guide section of the guide wall such that the valve member is movable within the valve cavity in a second axial direction opposite the first axial direction to position the fluid conduit at a second location by applying a second electric current to the second electromagnetic coil. The haptic device may also include a fluidic device in fluid communication with the fluidic-device valve via an output line coupled to the fluidic-device valve and the fluidic device.

In some embodiments, the haptic device may include a controller that directs application of the first electric current to the first electromagnetic coil and also directs application of the second electric current to the second electromagnetic coil. Additionally or alternatively, the haptic device may include a pressure supply line and a pressure ground line coupled to the fluidic-device valve such that (i) the pressure supply line is in fluid communication with the output line when the fluid conduit defined by the valve member is positioned at the first location and (ii) the pressure ground line is in fluid communication with the output line when the fluid conduit defined by the valve member is positioned at the second location.

In some embodiments of the haptic device, action of the fluidic device may be actuated when the pressure supply line is supplied with a fluid at an elevated pressure and is in fluid communication with the output line. According to certain embodiments, an action of the fluidic device may be actuated when the pressure ground line is in fluid communication with the output line.

In certain examples, the haptic device may include a haptic glove configured to operate within a virtual reality system, and the virtual reality system may include a head-mounted display device and the haptic device.

Some embodiments may involve a method involving applying a first electric current to a first electromagnetic coil of a fluidic-device valve to move a valve member of the fluidic-device valve in a first axial direction along a central axis to position a fluid conduit defined by the valve member at a first location. The fluidic-device valve may include a valve guide that has a guide wall surrounding the central axis and including a first guide section, a second guide section, and an interior surface that defines a valve cavity extending longitudinally along the central axis from the first guide section to the second guide section. The valve may also include a valve member movably disposed within the valve cavity, where the valve member includes a ferromagnetic material and extends longitudinally along the central axis. The valve member may also include a first plug section and a second plug section and may define the fluid conduit between the first plug section and the second plug section.

The valve may also include the first electromagnetic coil surrounding at least a portion of the first guide section of the guide wall. The valve may further include a second electromagnetic coil surrounding at least a portion of the second guide section of the guide wall. a second electric current to the second electromagnetic coil to move the valve member within the valve cavity in a second axial direction opposite the first axial direction to position the fluid conduit defined by the valve member is positioned at a second location.

In some embodiments, the method may also include at least one of (i) applying a first reduced electric current to the first electromagnetic coil of the fluidic-device valve when the fluid conduit defined by the valve member is positioned at the first location, where the first reduced electric current is lower than the first electric current or (ii) applying a second reduced electric current to the second electromagnetic coil of the fluidic-device valve when the fluid conduit defined by the valve member is positioned at the second location, where the second reduced electric current is lower than the second electric current.

According to certain embodiments, a pressure supply line, a pressure ground line, and an output line may each coupled to the fluidic-device valve such that (i) the pressure supply line is in fluid communication with the output line when the fluid conduit defined by the valve member is positioned at the first location and (ii) the pressure ground line is in fluid communication with the output line when the fluid conduit defined by the valve member is positioned at the second location.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
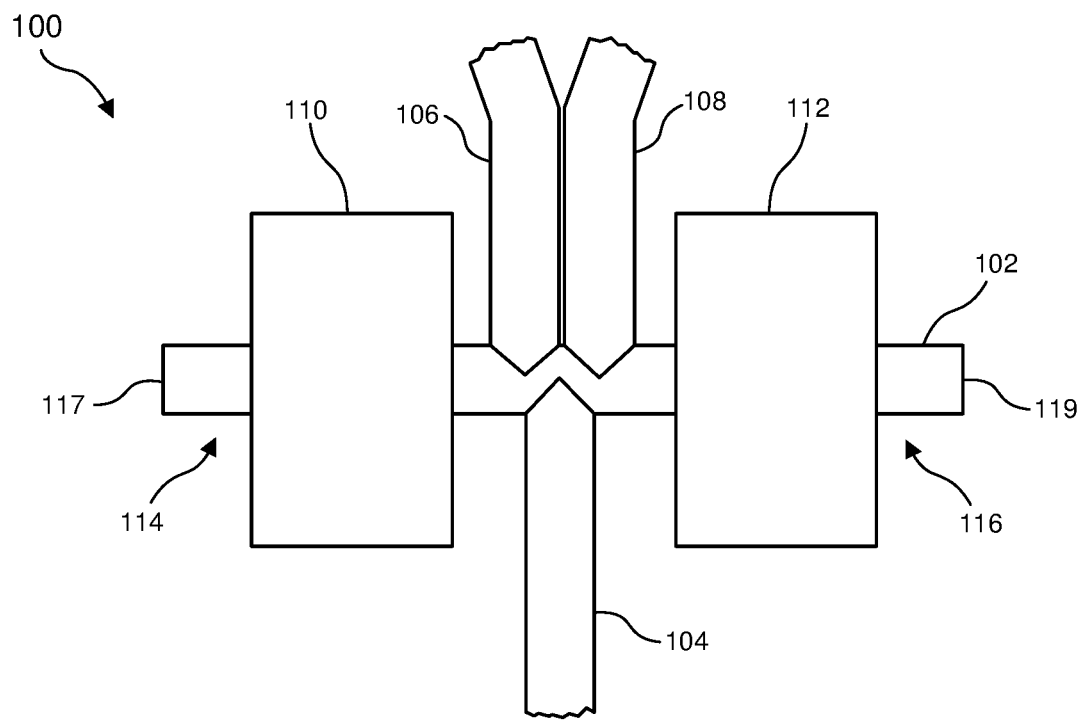
FIG. 1A is a side view of an exemplary fluidic-device valve in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to valve apparatuses, systems, and methods for use in fluidic systems. As will be explained in greater detail below, embodiments of the instant disclosure may include fluid-device valves for selectively conveying between various components of a fluid system, including fluidic devices and various elevated pressure and/or ground (e.g., ambient) pressure sources. The fluid-device valves may include valve members movably disposed within valve guides (e.g., valve guide pipes). The valve members may include plug sections that define fluid conduits for alternately conveying fluids between selected input and output lines. In at least one embodiment, the fluid-device valves may include electromagnetic coils that surround portions of the valve guides. The electromagnetic coils may supplied with electrical currents to generate electromagnetic fields that drive repositioning of the valve members within the valve guides, allowing for selection between two or more fluid paths through the fluid-device valves. In some embodiments, valve members may be moved within the valve members by applying fluid pressure and/or biasing forces to end surfaces of the valve members.

The disclosed apparatuses, systems, and methods may provide valves for actuating various fluidic devices, such as fluidic devices that may be used in wearable fabrics and/or systems (e.g., haptic systems). The disclosed fluidic-device valves may be reduced in size and/or weight in comparison to conventional valves, facilitating incorporation of such fluidic-device valves into haptic devices and systems. The fluidic-device valves may be more readily utilized in multiple locations within fluidic circuits while minimizing resistance to flow, fluid in-line inertia, action delay and reducing additional costs and complexity. Accordingly, fluidic-device valves described herein may allow for the design of fluidic systems, such as haptic systems, having greater variability and customizability.

The following will provide, with reference to FIGS. 1A-10, detailed descriptions of fluidic-device valves and fluidic systems that include fluidic-device valves. The discussion corresponding to FIGS. 11-13 will provide detailed descriptions of an artificial reality environment in which the exemplary fluidic-device valves may operate. Additionally, the discussion corresponding to FIGS. 14 and 15 will provide detailed descriptions of methods for using fluidic-device valves.

FIGS. 1A-3C illustrate an exemplary fluidic-device valve 100 in accordance with some embodiments. Fluidic-device valve 100 generally represents any type or form of valve device, such as a 3-way valve, that may be utilized in fluidic systems including one or more fluidic devices. Fluidic-device valve 100 may be actuated to selectively direct fluid from one or more sources to one or more outputs.

Figure 1B:
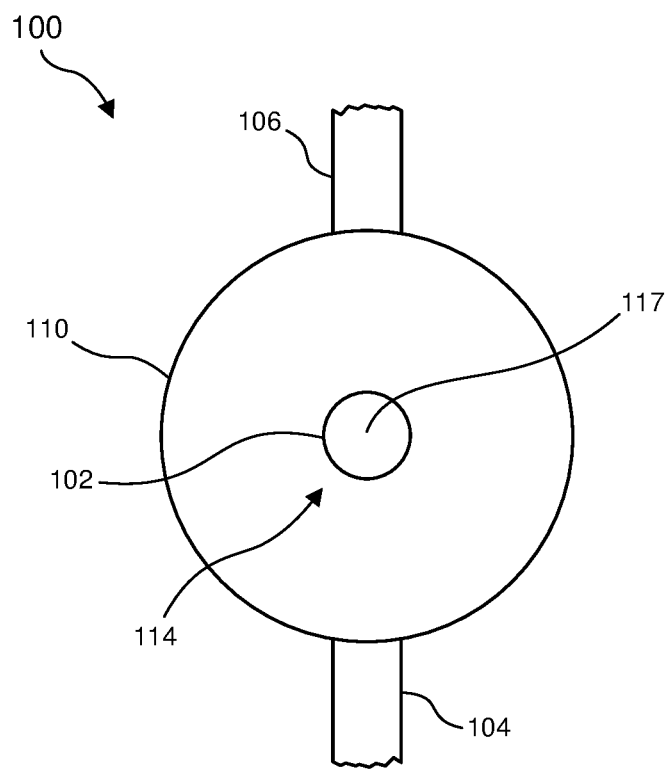
FIG. 1B is a front view of the fluidic-device valve of FIG. 1A in accordance with some embodiments.

As shown in FIGS. 1A and 1B, fluidic-device valve 100 may include a valve guide 102 (e.g., a valve guide pipe) and a plurality of fluid lines, including a central line 104, a first branch line 106, and a second branch line 108, coupled to valve guide 102. For example, central line 104, first branch line 106, and second branch line 108 may include end portions that are coupled to an exterior of valve guide 102. Central line 104, first branch line 106, and second branch line 108 may convey any suitable fluids, such as gases (e.g., air) or liquids (e.g., water) between fluidic-device valve 100 and various other components of a fluidic system. Central line 104, first branch line 106, and second branch line 108 may include any suitable type of fluid conduit, such as, for example, polymeric tubing. Fluidic-device valve 100 may also include a first electromagnetic coil assembly 110 and a second electromagnetic coil assembly 112 surrounding portions of valve guide 102. Valve guide 102 may include a first guide section 114 and a second guide section 116 on first and second sides of central line 104, first branch line 106, and second branch line 108, respectively. As shown in FIGS. 1A and 1B, first electromagnetic coil assembly 110 may surround at least a portion of first guide section 114 and second electromagnetic coil assembly 112 may surround at least a portion of second guide section 116.

Figure 2:
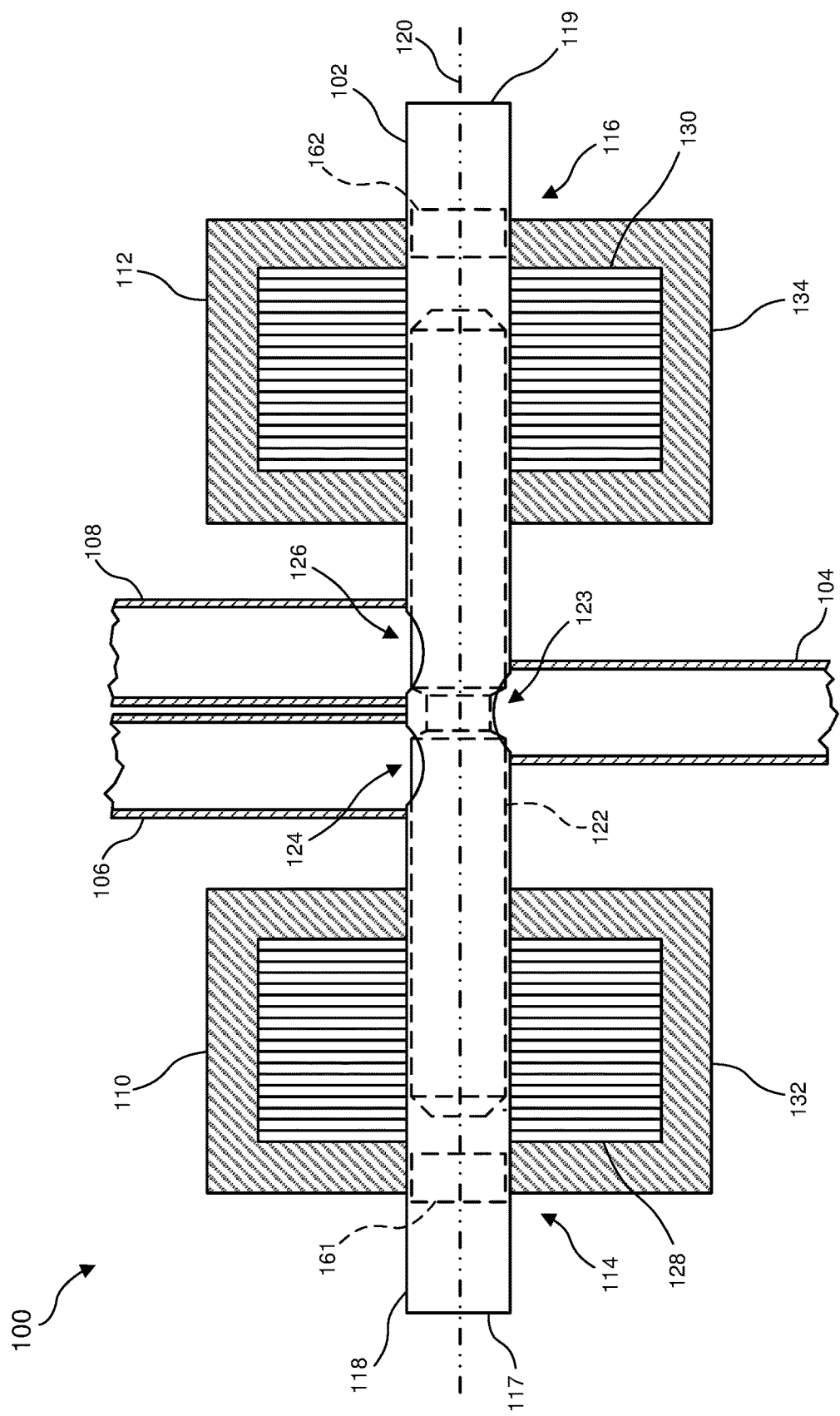
FIG. 2 is a partial cross-sectional side view of the fluidic-device valve of FIG. 1A in accordance with some embodiments.

FIG. 2 is a partial cross-sectional view of fluidic-device valve 100 shown in FIGS. 1A and 1B. As illustrated in FIG. 2, valve guide 102 may include a guide wall 118 surrounding and longitudinally extending along a central axis 120 between a first end 117 and a second end 119 of valve guide 102. As will be described in greater detail below, a valve member 122 may be disposed within a cavity defined by guide wall 118. Various openings corresponding to fluid lines coupled to valve guide 102 may be defined in guide wall 118. For example, a central opening 123 corresponding with central line 104 may be defined in guide wall 118 at a location that is, for example, located centrally between first guide section 114 and second guide section 116. Additionally, a first branch opening 124 and a second branch opening 126 respectively corresponding with first branch line 106 and second branch line 108 may be defined in guide wall 118 at locations between first guide section 114 and second guide section 116. Each of central opening 123, first branch opening 124, and second branch opening 126 may extend through guide wall 118 between an interior cavity (i.e., valve cavity 138 shown in FIGS. 3A and 3B) and an exterior of guide wall 118.

Central line 104, first branch line 106, and second branch line 108 may respectively surround central opening 123, first branch opening 124, and second branch opening 126 at corresponding exterior portions of guide wall 118. Central line 104, first branch line 106, and second branch line 108 may each be coupled to guide wall 118 in any suitable manner, such as by mechanical fastening, bonding, and/or any other suitable coupling, to form a sealed connection preventing fluid leakage between an interior and exterior of guide wall 118, central line 104, first branch line 106, and second branch line 108. While central line 104, first branch line 106, and second branch line 108 may be coupled directly to an exterior surface of valve guide 102 as shown in FIG. 2, central line 104, first branch line 106, and/or second branch line 108 may additionally or alternatively be coupled to structures protruding from valve guide 102, such as, for example, protruding fluid ports and/or any other suitable structures. According to some examples, central line 104, first branch line 106, and/or second branch line 108 may be integrally formed with guide wall 118. In various embodiments, fluidic-device valve 100 may also include a first stopper 161 and a second stopper 162 disposed within valve guide 102.

As shown in FIG. 2, first electromagnetic coil assembly 110 and second electromagnetic coil assembly 112 may respectively include a first electromagnetic coil 128 and a second electromagnetic coil 130 wound around corresponding exterior portions of first guide section 114 and second guide section 116 of valve guide 102. First electromagnetic coil 128 and second electromagnetic coil 130 may each be coupled to an electrical current source (see FIGS. 3A, 3B, and 4) such that first electromagnetic coil 128 and second electromagnetic coil 130 act as linear solenoids respectively surrounding portions of valve guide 102 and corresponding portions of valve member 122 disposed within valve guide 102. In some embodiments, first electromagnetic coil assembly 110 and second electromagnetic coil assembly 112 may also respectively include a first flux guide 132 surrounding at least a portion of first electromagnetic coil 128 and a second flux guide 134 surrounding at least a portion of second electromagnetic coil 130, as illustrated in FIG. 2. For example, first flux guide 132 and second flux guide 134 may surround respective portions of first electromagnetic coil 128 and second electromagnetic coil 130 that do not directly abut valve guide 102. As will be described in greater detail below, first electromagnetic coil assembly 110 and second electromagnetic coil assembly 112 may each be selectively supplied with a current to magnetically move valve member 122 within valve guide 102 along central axis 120 using the magnetic suction of the magnetic plug into the flux return when the respective coil is activated.

Figure 3A:
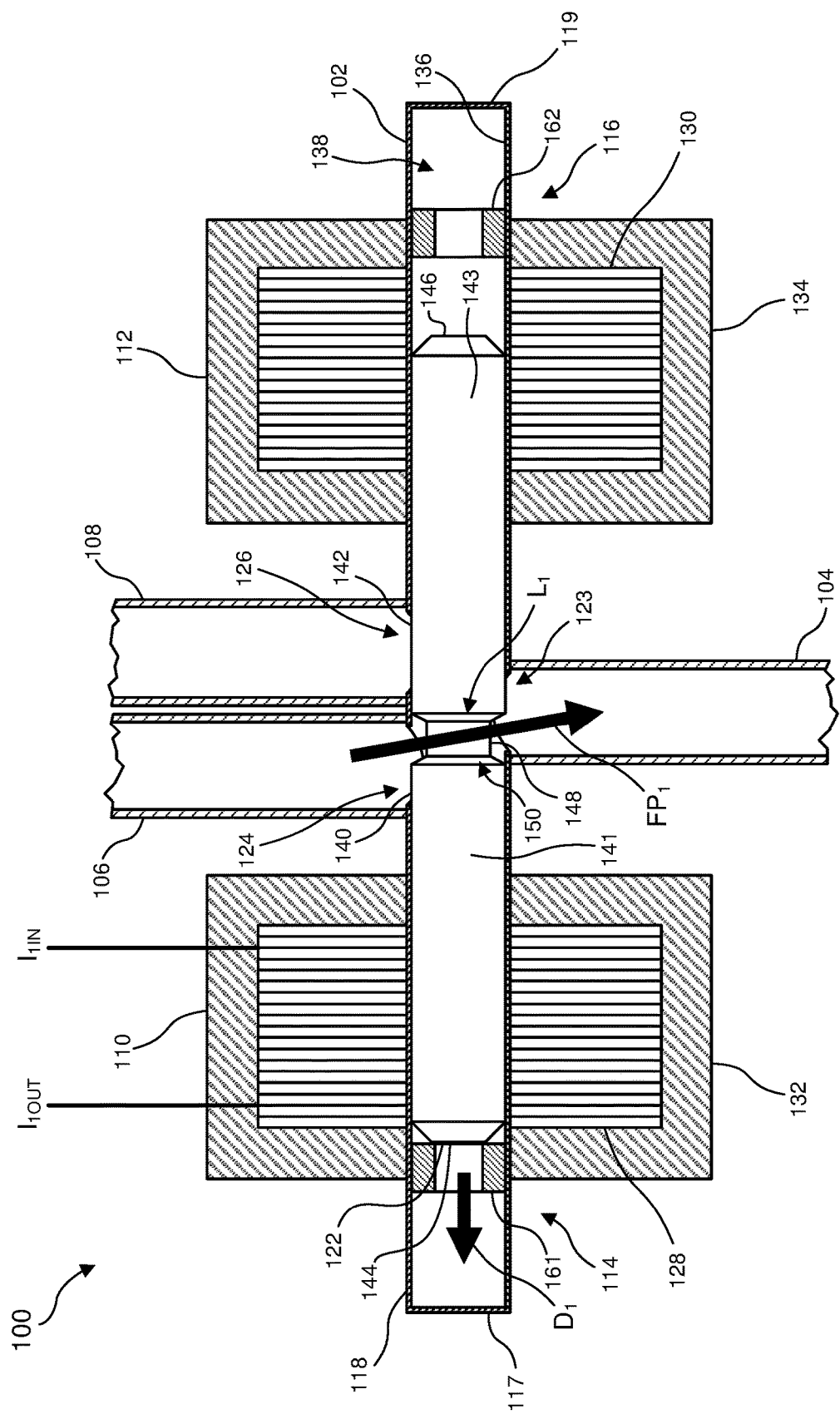
FIG. 3A is a partial cross-sectional side view of the fluidic-device valve of FIG. 1A in accordance with some embodiments.
Figure 3B:
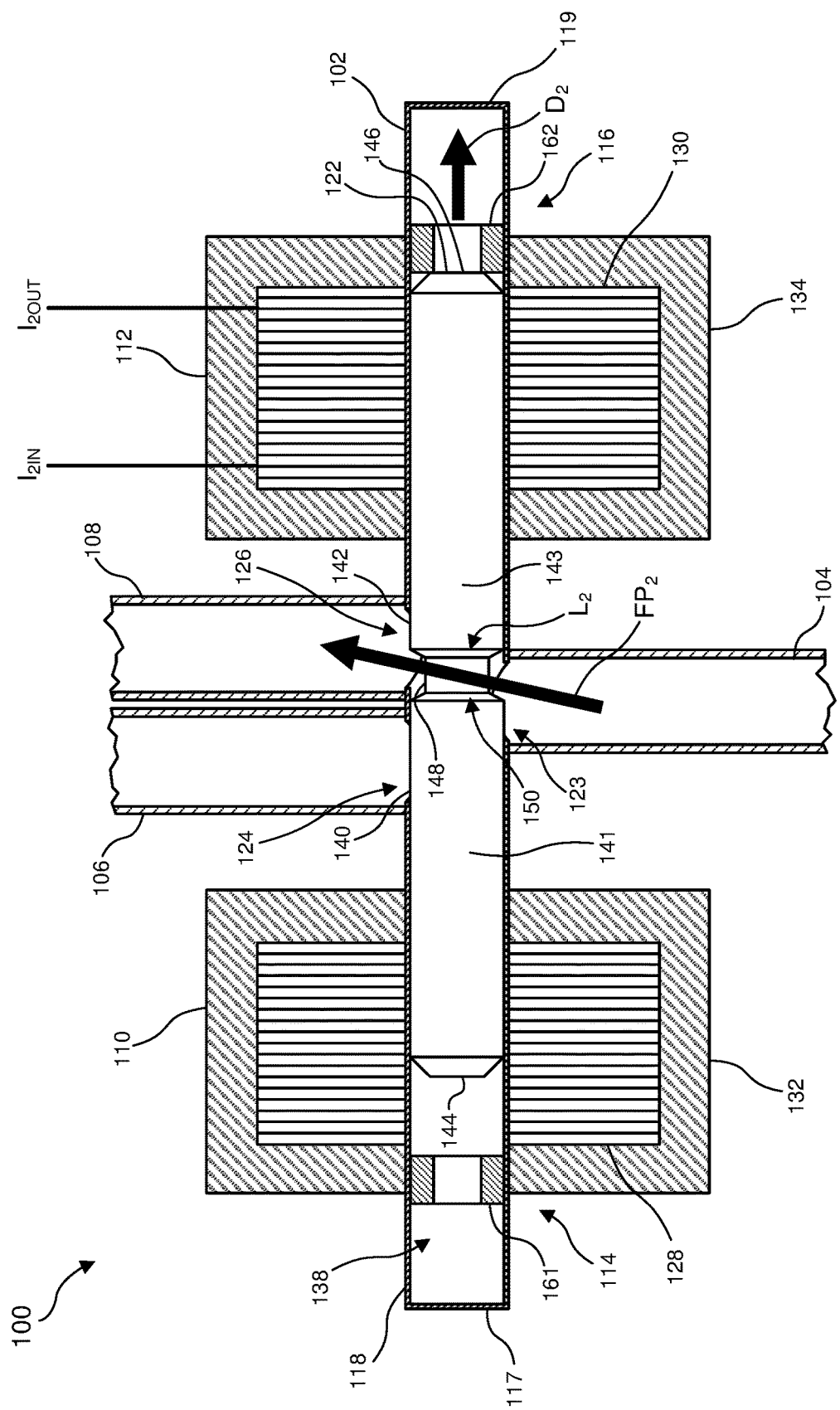
FIG. 3B is a partial cross-sectional side view of the fluidic-device valve of FIG. 1A in accordance with some embodiments.

FIGS. 3A and 3B are partial cross-sectional views showing further details of fluidic-device valve 100 shown in FIGS. 1A-2. As shown in these figures, valve member 122 may be disposed within a valve cavity 138 defined by an interior surface 136 of valve guide 102. At least a portion of interior surface 136, including portions abutting valve member 122, may have a cylindrical or substantially cylindrical surface shape. Valve member 122 may include a first plug section 140 having a cylindrical or substantially cylindrical outer surface 141 and a second plug section 142 having a cylindrical or substantially cylindrical outer surface 143, with first plug section 140 and second plug section 142 disposed apart from each other along central axis 120. In some examples, portions of interior surface 136 and corresponding surface portions of valve member 122 may have any other suitable surface shapes, including non-cylindrical surface shapes, without limitation. Outer surface 141 and outer surface 143 may correspond to and abut interior surface 136, allowing valve member 122 to move within valve cavity 138 along central axis 120 within valve cavity 138. For example, first plug section 140 may abut interior surface 136 at first guide section 114 of valve guide 102 and second plug section 142 may abut interior surface 136 at second guide section 116 of valve guide 102.

Figure 3C:
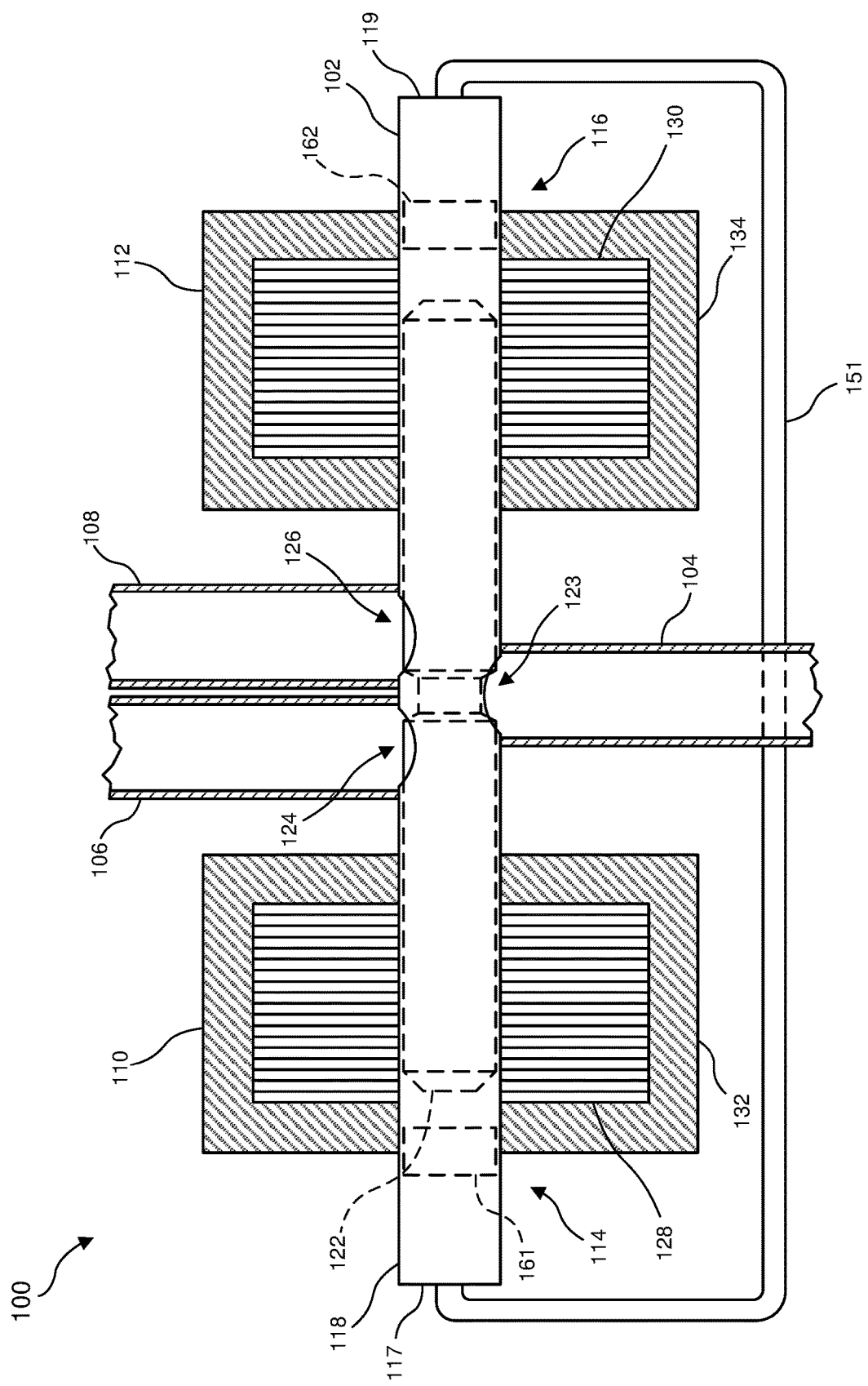
FIG. 3C is a partial cross-sectional side view of an exemplary fluidic-device valve in accordance with some embodiments.

Valve member 122 may extend longitudinally along central axis 120 between a first end 144 and a second end 146 of valve member 122. First and second ends 144 and 146 may have suitable profiles to optimize the force profile applied by the magnetic field to valve member 122 by, for example, linearizing the response of valve member 122. For example, as shown in FIGS. 2-3C, portions of valve member 122 at first and second ends 144 and 146 may have a reduced and/or tapered profile. Additionally, valve member 122 may include a reduced diameter section 148 disposed between first plug section 140 and second plug section 142. Additionally or alternatively, valve member 122 may define one or more openings or channels extending through a portion of valve member 122 between first plug section 140 and second plug section 142. As shown in FIGS. 3A and 3B, reduced diameter section 148 may have a smaller diameter about central axis 120 than each of first plug section 140 and second plug section 142 such that reduced diameter section 148 is separated from interior surface 136 of valve guide 102. Reduced diameter section 148 may have any suitable surface shape, including, for example, a cylindrical or substantially cylindrical shape and/or any other suitable shape. Reduced diameter section 148 together with adjacent end portions of first plug section 140 and second plug section 142 may define a fluid conduit 150 between first plug section 140 and second plug section 142. Fluid conduit 150 may, for example, be a circumferential groove, or any other suitably shaped groove, surrounding reduced diameter section 148 around central axis 120. First plug section 140 and second plug section 142, which closely abut and/or contact interior surface 136, may prevent or inhibit passage of fluid through portions of valve cavity 138, while fluid conduit 150 may selectively enable passage of fluid through selected regions of valve cavity 138.

Fluid conduit 150 may be designed to selectively interface with first branch opening 124, second branch opening 126, and/or central branch opening 123 of valve guide 102 in any suitable manner. For example, fluid conduit 150 may have a length along central axis 120 such that (i) first plug section 140 of valve member 122 completely or substantially occludes and closes first branch opening 124 prior to fluid conduit 150 beginning to overlap and interface with second branch opening 126 and such that (ii) second plug section 142 of valve member 122 completely or substantially occludes and closes second branch opening 126 prior to fluid conduit 150 beginning to overlap and interface with first branch opening 124. In some examples, fluid conduit may have a relatively greater length along central axis 120 and/or first branch opening 124 and second branch opening 126 may be selectively spaced apart from each other to enable fluid conduit 150 to simultaneously interface with both first branch opening 124 and second branch opening 126 when fluid conduit 150 at least partially overlaps both first branch opening 124 and second branch opening 126 (see, e.g., FIG. 2).

According to some embodiments, electrical currents may be selectively applied to first electromagnetic coil assembly 110 and second electromagnetic coil assembly 112 to move valve member 122 within valve guide 102, thereby allowing selective passage of fluid between central line 104, first branch line 106, and second branch line 108. For example, as shown in FIG. 3A, an electrical current from an external current source (e.g., valve controller 158 shown in FIG. 4) may be applied to first electromagnetic coil 128, with an input current $I_{1IN}$ being supplied to first electromagnetic coil 128 and an output current $I_{1OUT}$ exiting first electromagnetic coil 128. Applying the electrical current to first electromagnetic coil 128 may produce a magnetic field around first electromagnetic coil 128, with a portion of the magnetic field (i.e., magnetic flux) within first guide section 114 of valve guide 102 oriented in a first axial direction $D_1$ along central axis 120 as shown in FIG. 3A.

First flux guide 132 surrounding portions of first electromagnetic coil 128 may include a magnetically conductive material (e.g., a magnetically conductive metal, etc.) providing a magnetic flux permeable path that offers low resistance to the magnetic field in regions outside of valve guide 102. Valve guide 102 may be formed of a material, such as a polymer material and/or any other suitable material, that does not interfere substantially with the magnetic field produced by first magnetic flux guide 132 and first electromagnetic coil 128. In at least one example, the thickness of at least a portion of guide wall 118 may be minimized such that first electromagnetic coil 128 is disposed in close proximity to valve member 122, increasing the relative strength of the magnetic field to which valve member 122 is exposed. Additionally, valve member 122 may include a ferromagnetic material, such as a suitable metallic material, that is magnetically attracted toward a central region of the magnetic field produced by first magnetic flux guide 132 and first electromagnetic coil 128. Accordingly, valve member 122 may move in first axial direction $D_1$ in the presence of the magnetic field produced by first electromagnetic coil 128 such that fluid conduit 150 is positioned, for example, at a first location $L_1$ within valve guide 102. First stopper 161 may have at least a portion disposed within and contacting a corresponding portion of interior surface 136 of valve guide 102 and may have a narrower inner diameter than interior surface 136, preventing movement of valve member 122 along central axis 120 in direction $D_1$ beyond first stopper 161, as illustrated in FIG. 3A.

As shown in FIG. 3A, when fluid conduit 150 of valve member 122 is positioned at first location $L_1$, central line 104 may be in fluid communication with first branch line 106 via fluid conduit 150 such that fluid conduit 150 provides a fluid path $FP_1$ through valve guide 102 between first branch line 106 and central line 104. Additionally, when fluid conduit 150 of valve member 122 is positioned at first location $L_1$, second plug section 142 of valve member 122 may cover or substantially cover second branch opening 126 such that flow of a fluid between second branch line 108 and valve cavity 138 is blocked or inhibited. In at least one embodiment, a fluid in first branch line 106 may be at a higher pressure than central line 104 such that the fluid from first branch line 106 flows toward central line 104. For example, first branch line 106 may be coupled to an elevated pressure supply source and central line 104 may be coupled to a fluid device, as will be described in greater detail below (see FIG. 4). Additionally or alternatively, fluid from central line 104 may flow in an opposite direction toward first branch line 106 via fluid conduit 150 under various conditions and/or a pressure differential between central line 104 and first branch line 106 may equalize or substantially equalize after a period of time.

In at least one embodiment, as shown in FIG. 3B, another electrical current from an external current source (e.g., valve controller 158 shown in FIG. 4) may be applied to second magnetic flux guide 134 and second electromagnetic coil 130, with an input current $I_{2IN}$ being supplied to second magnetic flux guide 134 and second electromagnetic coil 130 and an output current $I_{2OUT}$ exiting second magnetic flux guide 134 and second electromagnetic coil 130. Applying the electrical current to second magnetic flux guide 134 and second electromagnetic coil 130 may produce a magnetic field around second electromagnetic coil 130, with a portion of the magnetic field (i.e., magnetic flux) within second guide section 116 of valve guide 102 oriented in a second axial direction $D_2$ along central axis 120 as shown in FIG. 3B. Second flux guide 134 surrounding portions of second electromagnetic coil 130 may include a magnetically conductive material (e.g., a magnetically conductive metal, etc.) providing a magnetic flux permeable path that offers low resistance to the magnetic field in regions outside of valve guide 102. In at least one example, the thickness of at least a portion of guide wall 118 may be minimized such that second electromagnetic coil 130 is disposed in close proximity to valve member 122, increasing the relative strength of the magnetic field to which valve member 122 is exposed. Valve member 122 may be magnetically attracted toward central region of the magnetic field produced by second electromagnetic coil 130 such that valve member 122 moves in second axial direction $D_2$ in the presence of the magnetic field produced by second electromagnetic coil 130 and such that fluid conduit 150 is positioned, for example, at a second location $L_2$ within valve guide 102. Second stopper 162 may have at least a portion disposed within and contacting a corresponding portion of interior surface 136 of valve guide 102 and may have a narrower inner diameter than interior surface 136, preventing movement of valve member 122 along central axis 120 in direction $D_2$ beyond second stopper 162, as illustrated in FIG. 3B.

As shown in FIG. 3B, when fluid conduit 150 of valve member 122 is positioned at second location $L_2$, central line 104 may be in fluid communication with second branch line 108 via fluid conduit 150 such that fluid conduit 150 provides a fluid path $FP_2$ through valve guide 102 between central line 104 and second branch line 108. Additionally, when fluid conduit 150 of valve member 122 is positioned at second location $L_2$, first plug section 140 of valve member 122 may cover or substantially cover first branch opening 124 such that flow of a fluid between first branch line 106 and valve cavity 138 is blocked or inhibited. In at least one embodiment, a fluid in central line 104 may, at least temporarily, be at a higher pressure than second branch line 108 such that the fluid from central line 104 flows toward second branch line 108. Additionally or alternatively, fluid from second branch line 108 may flow in an opposite direction toward central line 104 via fluid conduit 150 under various conditions. In some embodiments, where, for example, central line 104 is coupled to a fluidic device and second branch line 108 is coupled to a pressure ground (e.g., atmospheric or ambient pressure, a relatively large fluid reservoir, etc.), a pressure differential between central line 104 and second branch line 108 may equalize or substantially equalize after a period of time.

Figure 5A:
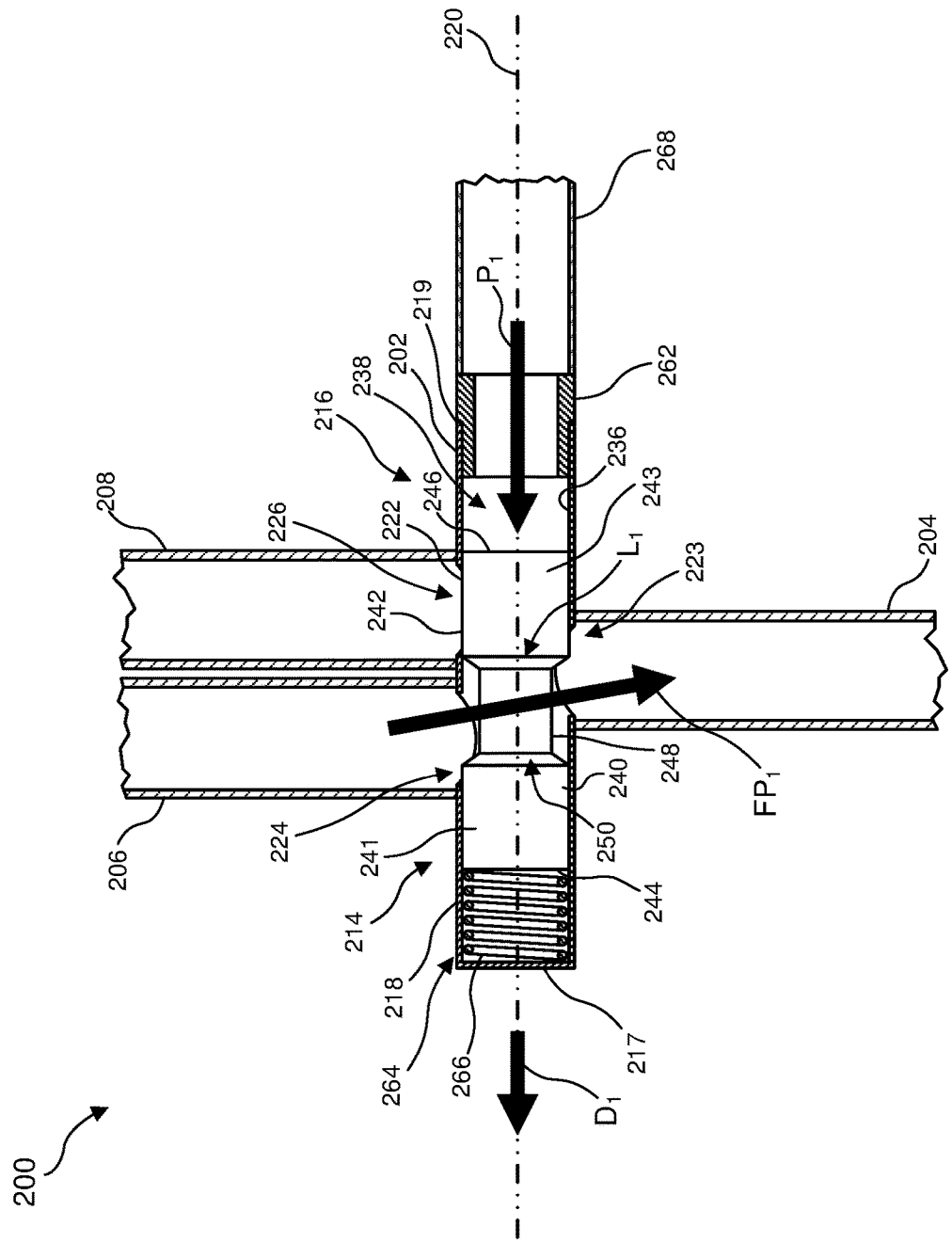
FIG. 5A is a partial cross-sectional side view of an exemplary fluidic-device valve in accordance with some embodiments.
Figure 5B:
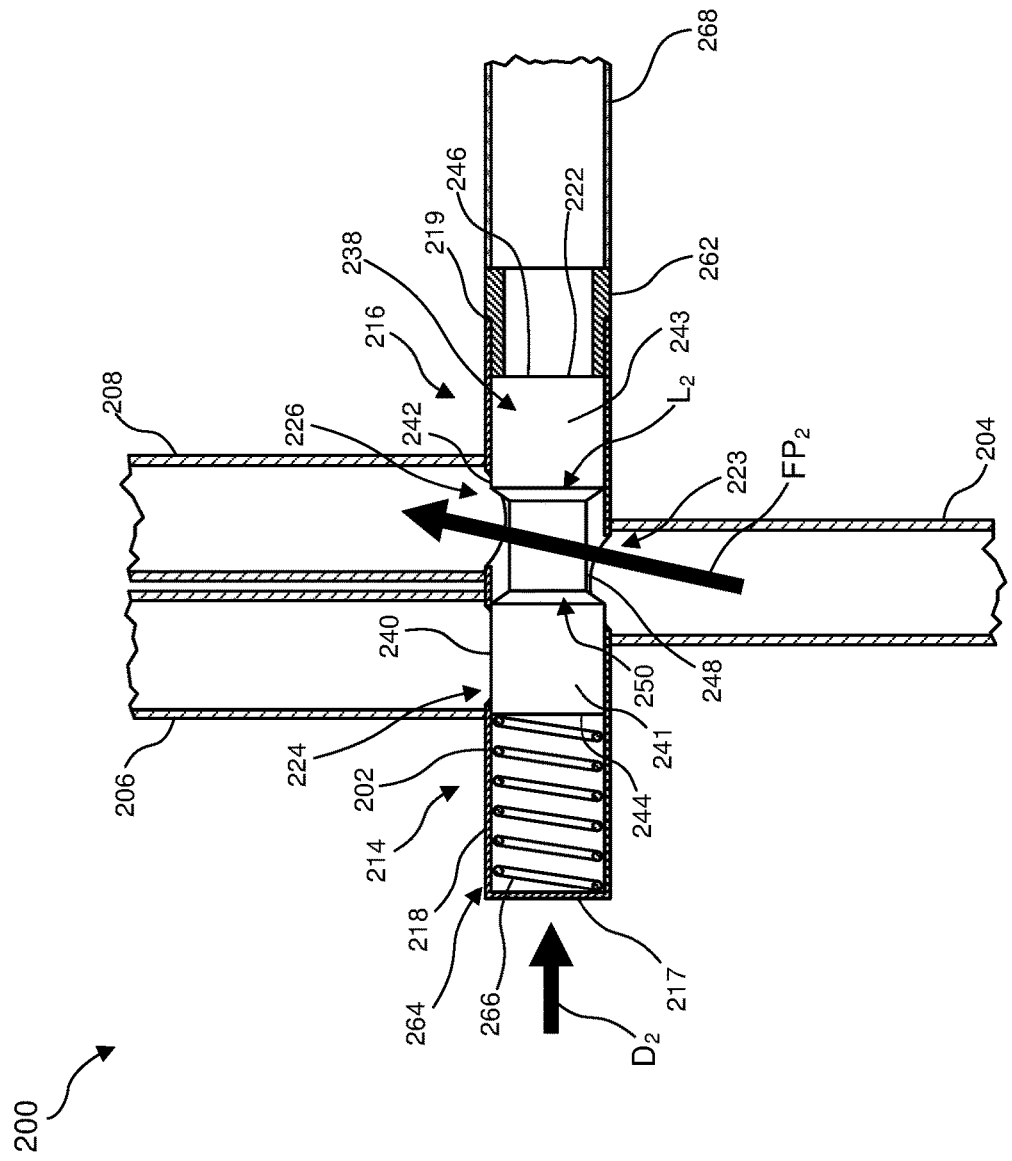
FIG. 5B is a partial cross-sectional side view of the fluidic-device valve of FIG. 5A in accordance with some embodiments.
Figure 5C:
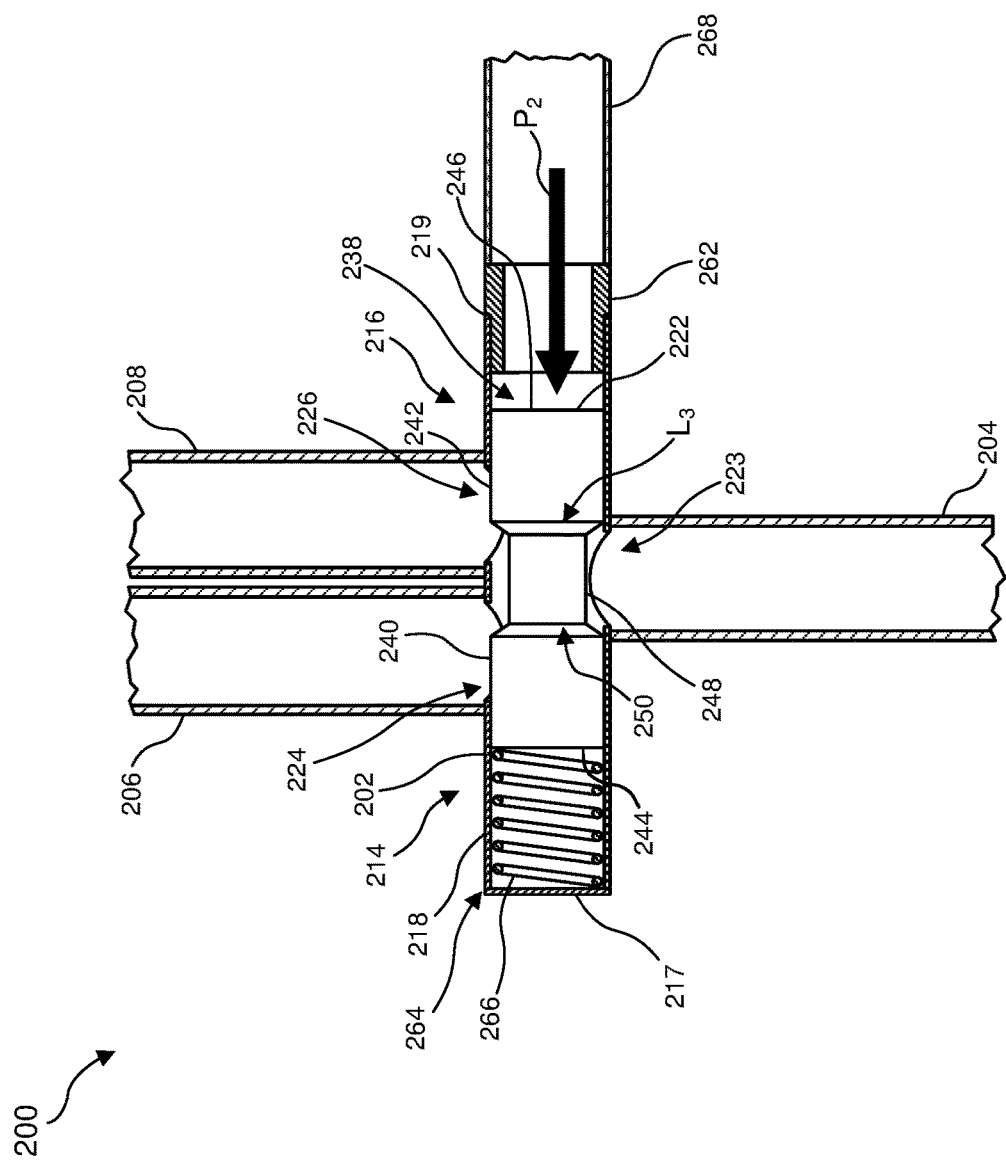
FIG. 5C is a partial cross-sectional side view of the fluidic-device valve of FIG. 5A in accordance with some embodiments.

In some examples, fluid conduit 150 of valve member 122 may be positioned at an intermediate location between first location $L_1$ and second location $L_2$ such that fluid conduit 150 enables simultaneous passage of fluid between central line 104 and each of first branch line 106 and second branch line 108 (see, e.g., FIG. 5C). For example, a current supplied to first electromagnetic coil 128 and/or second electromagnetic coil 130 may be pulsed for a limited amount of time sufficient to move fluid conduit 150 of valve member 122 to the intermediate location and/or currents may be simultaneously supplied to first electromagnetic coil 128 and second electromagnetic coil 130 such that fluid conduit 150 of valve member 122 is positioned at the intermediate location midway between first electromagnetic coil 128 and second electromagnetic coil 130.

According to various embodiments, electrical currents applied to first electromagnetic coil 128 and second electromagnetic coil 130 may be applied for limited periods of time to avoid generation of excessive heat within first electromagnetic coil assembly 110, second electromagnetic coil assembly 112, and/or valve member 122. For example, an electrical current applied to first electromagnetic coil 128 or second electromagnetic coil 130 may be pulsed for a limited period of time sufficient to move valve member 122 into a desired position (see, e.g., FIGS. 3A and 3B). Following the pulsed current application, a current may no longer be applied and/or a lower current may be applied to first electromagnetic coil 128 or second electromagnetic coil 130 to generate a minimal magnetic field sufficient to maintain valve member 122 in the desired position along central axis 120 without (in case of no current) or minimal power dissipation. For example, once valve member 122 is positioned within valve cavity 138 of valve guide 102, portions of valve member 122 may be engaged (e.g., frictionally engaged) with adjacent portions of interior surface 136 of valve guide 102 such that valve member 122 remains in position without application of a magnetic field. Additionally or alternatively, a much lower magnetic field may be required to maintain valve member 122 in a particular position in comparison to a larger magnetic field required to move valve member 122 to a separate position along central axis 120.

In some embodiments, as shown in FIG. 3C, a coupling passage 151 may be coupled to end portions of valve guide 102, such as an end portion extending from first end 117 of valve guide 102 to first end 144 of valve member 122 and an end portion extending from second end 119 of valve guide 102 to second end 146 of valve member 122, to equalize pressure in these end portions. Such pressure equalization may facilitate movement of valve member 122 within valve guide 102 and/or may enable valve member 122 to be more easily maintained in a desired position within valve guide 102. In at least one example, as shown in FIG. 3C, coupling passage 151 may be in fluid communication with valve cavity 138 at the respective end portions of valve guide 102. Additionally or alternatively, end portions of valve guide 102 may each be open to a common pressure source, such as a pressure ground, such that a pressure differential between the end portions is minimized or eliminated.

Figure 4:
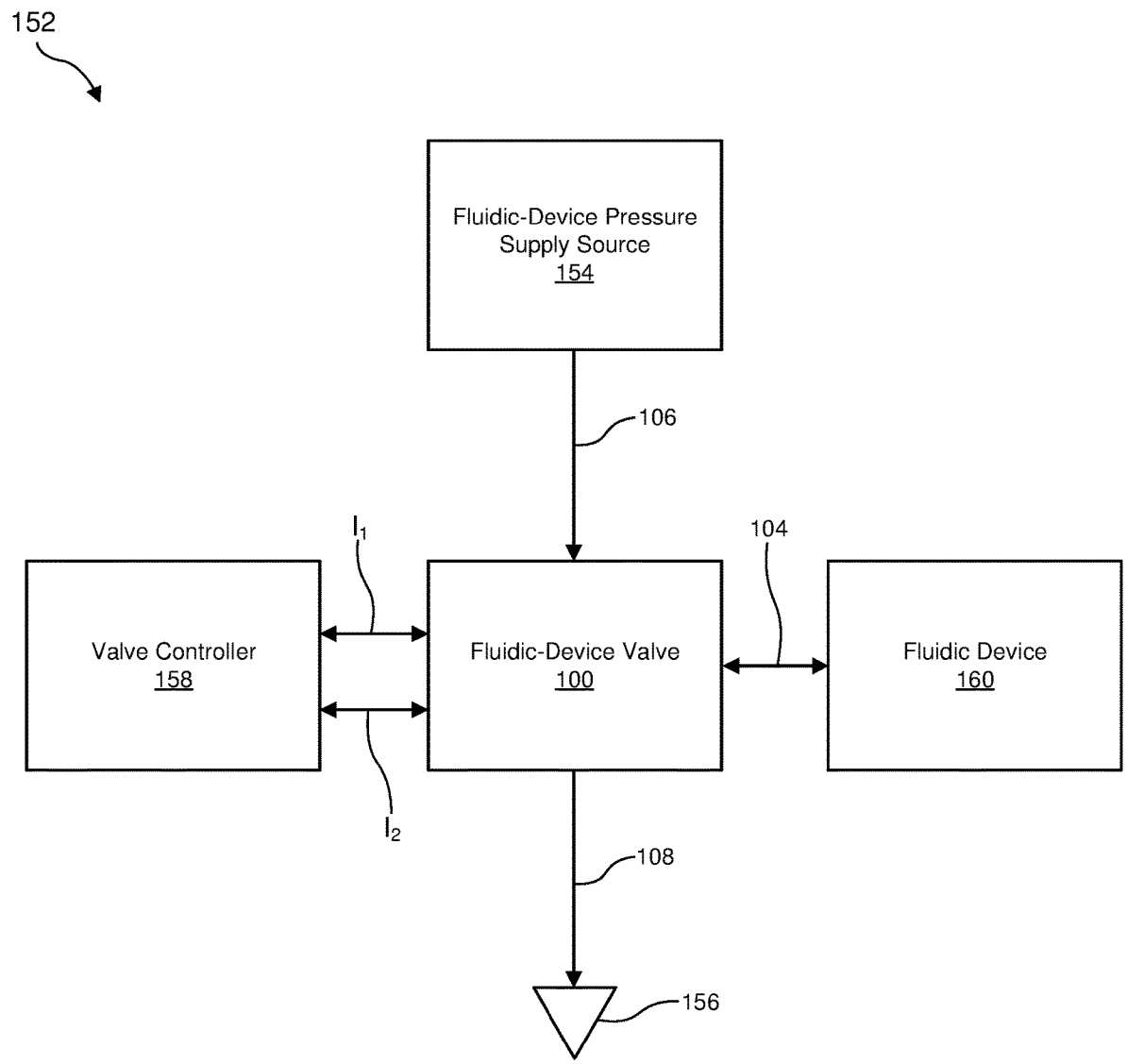
FIG. 4 is a block diagram of an exemplary fluidic system in accordance with some embodiments.

FIG. 4 illustrates an exemplary fluidic system 152 that includes a fluidic-device valve 100 (see FIGS. 1A-3C) according to some embodiments. As shown in this figure, a fluidic device 160 may be in fluid communication with fluidic-device valve 100 via central line 104 (i.e., an output line). Fluidic device 160 may include any suitable fluidic device, such as a fluidic device that is changed from one state to another state by a fluid supplied from a pressurized fluid source. For example, fluidic device 160 may include an actuator or other fluidic mechanism that is actuated by pressurized fluid (e.g., a gas, such as air, a liquid, such as water, etc.) delivered from a fluidic-device pressure supply source 154 shown in FIG. 4. Examples of fluidic device 160 may include, without limitation, fluidic devices utilized in haptic systems and/or any other suitable fluidic systems, such as fluidic circuits, pumps, latching gates, valves, sensors, actuators, control devices, power distribution devices, fluidistors and/or any other suitable fluidic devices.

In some embodiments, as shown in FIG. 4, fluidic-device pressure supply source 154 may be in fluid communication with fluidic-device valve 100 via first branch line 106 (e.g., a pressure supply line). In some embodiments, fluidic-device pressure supply source 154 may deliver pressurized fluid to a supply rail that is maintained in a pressurized state and that supplies the pressurized fluid to a plurality of components including fluidic-device valve 100. Pressurized fluid from fluidic-device pressure supply source 154 may be selectively delivered to fluidic device 160 by fluidic-device valve 100, which may change a fluid source and/or destination line (i.e., between first branch line 106 and second branch line 108) that is in fluid communication with central line 104 as shown in FIGS. 3A and 3B. Additionally, a pressure ground 156 may be in fluid communication with fluidic-device valve 100 via second branch line 108 (i.e., a pressure ground line). When a fluid utilized in fluidic system 152 is a gas, such as air, pressure ground 156 may include an opening that is in fluid communication with a local environment surrounding fluidic system 152 such that pressure ground 156 is at atmospheric and/or ambient pressure. In some embodiments, pressure ground 156 may include a sufficiently large fluid reservoir (e.g., gas reservoir or liquid reservoir) that is maintained at a reduced pressure that is lower than that supplied by fluidic-device pressure supply source 154. When a state of fluidic-device valve 100 is changed such that pressure ground 156 is in fluid communication with fluidic device 160, pressurized fluid from 160 may be directed from fluidic device 160 to pressure ground 156 such that the pressure exerted on fluidic device 160 is reduced, resulting, for example, in fluidic device 160 being returned to a non-actuated state.

Fluidic system 152 may also include a valve controller 158 that controls a state of fluidic-device valve 100 as shown in FIG. 4. For example, valve controller 158 may control fluidic-device valve 100 by selectively applying (e.g., by pulsing) a first electrical current $I_1$ applied to a first electromagnetic coil assembly 110 of fluidic-device valve 100 (see FIG. 3A) and a second electrical current $I_2$ applied to a second electromagnetic coil assembly 112 of fluidic-device valve 100 (see FIG. 3B) to change the position of a valve member 122 of fluidic-device valve 100, thereby altering a flow path through fluidic-device valve 100. Accordingly, valve controller 158 may switch the flow path through fluidic-device valve 100 such that fluidic device 160 is in fluid communication with fluidic-device pressure supply source 154 and/or pressure ground 156. In some embodiments, fluidic-device valve 100 may be in fluid communication with a plurality of fluidic devices that includes fluidic device 160.

FIGS. 5A-5C show partial cross-sectional views of an exemplary fluidic-device valve 200 in accordance with some embodiments. Fluidic-device valve 200 generally represents any type or form of valve device, such as a 3-way valve, that may be utilized in fluidic systems including one or more fluidic devices. Fluidic-device valve 200 may be actuated to selectively direct fluid from one or more sources to one or more outputs.

As shown in these figures, fluidic-device valve 200 may include a valve guide 202 and a plurality of fluid lines, including a central line 204, a first branch line 206, and a second branch line 208, coupled to valve guide 202. Valve guide 202 may have a first guide section 214 and a second guide section 216 on first and second sides of central line 204, first branch line 206, and second branch line 208, respectively. Valve guide 202 may include a guide wall 218 surrounding and longitudinally extending along a central axis 220 between a first end 217 and a second end 219 of valve guide 202. A valve member 222 may be disposed within a valve cavity 238 defined by an interior surface 236 of guide wall 218. In some examples, fluidic-device valve 200 may include a stopper 262 at second end 219. For example, stopper 262 may have portions disposed within and contacting corresponding portions of interior surface 236 at second end 219. Stopper 262 may have a narrower inner diameter than interior surface 236, preventing movement of valve member 222 along central axis 220 beyond stopper 262.

Various openings corresponding to fluid lines coupled to valve guide 202 may be defined in guide wall 218. For example, a central opening 223, a first branch opening 224, and a second branch opening 226 respectively corresponding with central line 204, first branch line 206, and second branch line 208 may be defined in guide wall 218 at locations between first guide section 214 and second guide section 216. Each of central opening 223, first branch opening 224, and second branch opening 226 may extend through guide wall 218 between valve cavity 238 and an exterior of guide wall 218. Central line 204, first branch line 206, and second branch line 208 may respectively surround central opening 223, first branch opening 224, and second branch opening 226 at corresponding exterior portions of guide wall 218. Central line 204, first branch line 206, and second branch line 208 may each be coupled to guide wall 218 in any suitable manner, such as by mechanical fastening, bonding, and/or any other suitable coupling, to form a sealed connection preventing fluid leakage between an interior and exterior of guide wall 218, central line 204, first branch line 206, and second branch line 208. According to some examples, central line 204, first branch line 206, and/or second branch line 208 may be integrally formed with guide wall 218.

In various embodiments, at least a portion of interior surface 236, including a portion abutting valve member 222, may have a cylindrical or substantially cylindrical surface shape and/or any other suitable shape. Valve member 222 may include a first plug section 240 and a second plug section 242 having outer surfaces 241 and 243, respectively. Outer surfaces 241 and 243 may each be cylindrical or substantially cylindrical and/or any other suitable surface shape. First plug section 240 and second plug section 242 may be disposed apart from each other along central axis 220. Outer surface 241 and outer surface 243 may correspond to and abut interior surface 236, allowing valve member 222 to move within valve cavity 238 along central axis 220 within valve cavity 238. For example, first plug section 240 may abut interior surface 236 at first guide section 214 of valve guide 202 and second plug section 242 may abut interior surface 236 at second guide section 216 of valve guide 202. Valve member 222 may extend longitudinally along central axis 220 between a first end 244 and a second end 246 of valve member 222.

Additionally, valve member 222 may include a reduced diameter section 248 disposed between first plug section 240 and second plug section 242. Reduced diameter section 248 may have a smaller diameter about central axis 120 than each of first plug section 240 and second plug section 242 such that reduced diameter section 248 is separated from interior surface 236 of valve guide 202. Reduced diameter section 248 may have any suitable surface shape, including, for example, a cylindrical or substantially cylindrical shape and/or any other suitable shape. Reduced diameter section 248 together with adjacent end portions of first plug section 240 and second plug section 242 may define a fluid conduit 250 between first plug section 240 and second plug section 242. Fluid conduit 250 may, for example, be a circumferential groove surrounding reduced diameter section 248 around central axis 220. First plug section 240 and second plug section 242, which closely abut and/or contact interior surface 236, may prevent or inhibit passage of fluid through portions of valve cavity 238, while fluid conduit 250 may selectively enable passage of fluid through corresponding regions of valve cavity 238.

According to some embodiments, a gate line 268 may be coupled to valve guide 202 at, for example, stopper 262 and/or second guide section 216 (e.g., at or near second end 219 of valve guide 202), as shown in FIGS. 5A-5C. Stopper 262 may define a hole permitting fluid communication between gate line 268 and valve cavity 238. Additionally, as shown these figures, fluidic-device valve 200 may include a biasing mechanism 264 in first guide section 214 of valve guide 202 at a location between first end 244 of valve member 222 and first end 217 of valve guide 202. For example, biasing mechanism 264 may include a spring 266, such as a compression spring and/or any other suitable type of spring, disposed between first end 244 of valve member 222 and first end 217 of valve guide 202. Additionally or alternatively, biasing mechanism 264 may include an enclosed medium (e.g., a gas, an elastically compressible material, such as a compressible foam material, etc.) disposed between first end 244 of valve member 222 and first end 217 of valve guide 202.

In at least one embodiment, as shown in FIG. 5A, a first elevated pressure $P_1$ (e.g., a pressure greater than a ground pressure, such as an atmospheric or ambient pressure) may be selectively applied to second guide section 216 of valve guide 202 by a pressure source via gate line 268 such that first elevated pressure $P_1$ is applied against second end 246 of valve member 222, forcing movement of valve member 222 in a first axial direction $D_1$ along central axis 220 such that fluid conduit 250 is positioned, for example, at a first location $L_1$ within valve guide 202 as illustrated in FIG. 5A. As valve member 222 is forced in first axial direction $D_1$ by first elevated pressure $P_1$, spring 266 and/or an enclosed medium of biasing mechanism 264 may be compressed between first end 244 of valve member 222 and first end 217 and of valve guide 202. Spring 266 and/or the enclosed medium may exert a force against first end 244 of valve member 222 in a second axial direction $D_2$ (see FIG. 5B) opposite first axial direction $D_1$.

As shown in FIG. 5A, when fluid conduit 250 of valve member 222 is positioned at first location $L_1$, central line 204 may be in fluid communication with first branch line 206 via fluid conduit 250 such that fluid conduit 250 provides a fluid path $FP_1$ through valve guide 202 between first branch line 206 and central line 204. Additionally, when fluid conduit 250 of valve member 222 is positioned at first location $L_1$, second plug section 242 of valve member 222 may cover or substantially cover second branch opening 226 such that flow of a fluid between second branch line 208 and valve cavity 238 is blocked or inhibited. In at least one embodiment, a fluid in first branch line 206 may be at a higher pressure than central line 204 such that the fluid from first branch line 206 flows toward central line 204. For example, first branch line 206 may be coupled to an elevated pressure supply source and central line 204 may be coupled to a fluid device, as will be described in greater detail below (see FIG. 6). Additionally or alternatively, fluid from central line 204 may flow in an opposite direction toward first branch line 206 via fluid conduit 250 under various conditions and/or a pressure differential between central line 204 and first branch line 206 may equalize or substantially equalize after a period of time.

In at least one embodiment, as shown in FIG. 5B, a pressure applied to second guide section 216 of valve guide 202 via gate line 268 may be reduced such that a pressure (e.g., a ground pressure, such as an atmospheric or ambient pressure) that is lower than first elevated pressure $P_1$ is applied against second end 246 of valve member 222. As the pressure exerted against second end 246 of valve member 222 is reduced, a force applied by spring 266 and/or an enclosed medium of biasing mechanism 264 against first end 244 of valve member 222 may be sufficient to move valve member 222 in second axial direction $D_2$ opposite first axial direction $D_1$ along central axis 220 such that fluid conduit 250 is positioned, for example, at a second location $L_2$ within valve guide 202.

As shown in FIG. 5B, when fluid conduit 250 of valve member 222 is positioned at second location $L_2$, central line 204 may be in fluid communication with second branch line 208 via fluid conduit 250 such that fluid conduit 250 provides a fluid path $FP_2$ through valve guide 202 between central line 204 and second branch line 208. Additionally, when fluid conduit 250 of valve member 222 is positioned at second location $L_2$, first plug section 240 of valve member 222 may cover or substantially cover first branch opening 224 such that flow of a fluid from first branch line 206 into valve cavity 238 is blocked or inhibited. In at least one embodiment, a fluid in central line 204 may, at least temporarily, be at a higher pressure than second branch line 208 such that the fluid from central line 204 flows toward second branch line 208. Additionally or alternatively, fluid from second branch line 208 may flow in an opposite direction toward central line 204 via fluid conduit 250 under various conditions. In some embodiments, where central line 204 is coupled to a fluidic device and second branch line 208 is coupled to a pressure ground (e.g., atmospheric or ambient pressure), a pressure differential between central line 204 and second branch line 208 may equalize or substantially equalize after a period of time.

In some embodiments, as shown in FIG. 5C, fluid conduit 250 of valve member 222 may be positioned at a third location $L_3$ disposed axially between first location $L_1$ and second location $L_2$. For example, a second elevated pressure $P_2$ that is lower than first elevated pressure $P_1$ may be selectively applied to second guide section 216 of valve guide 202 via gate line 268 such that second elevated pressure $P_2$ applied against second end 246 of valve member 222 is balanced with the oppositely directed force applied by biasing mechanism 264 against first end 244 such that fluid conduit 250 is positioned at third location $L_3$. As illustrated in FIG. 5C, fluid conduit 250 may be dimensioned such that, when fluid conduit 250 is positioned at third location $L_3$, fluid conduit 250 may at least partially overlap each of central opening 223, first branch opening 224, and second branch opening 226. Accordingly, fluid conduit 250 may be open to each of central line 204, first branch line 206, and second branch line 208 when fluid conduit 250 is positioned at third location $L_3$. Thus, positioning and holding fluid conduit 250 at third location $L_3$ may enable simultaneous passage of fluid between central line 204 and each of first branch line 206 and second branch line 208. In some embodiments, an electromagnetic coil assembly, such as first electromagnetic coil assembly 110 and/or second electromagnetic coil assembly 112 illustrated in FIGS. 1A-3C, may be utilized in fluidic-device valve 200 to additionally or alternatively drive movement of valve member 222 in direction $D_1$ and/or direction $D_2$ shown in FIGS. 5A and 5B.

Figure 6:
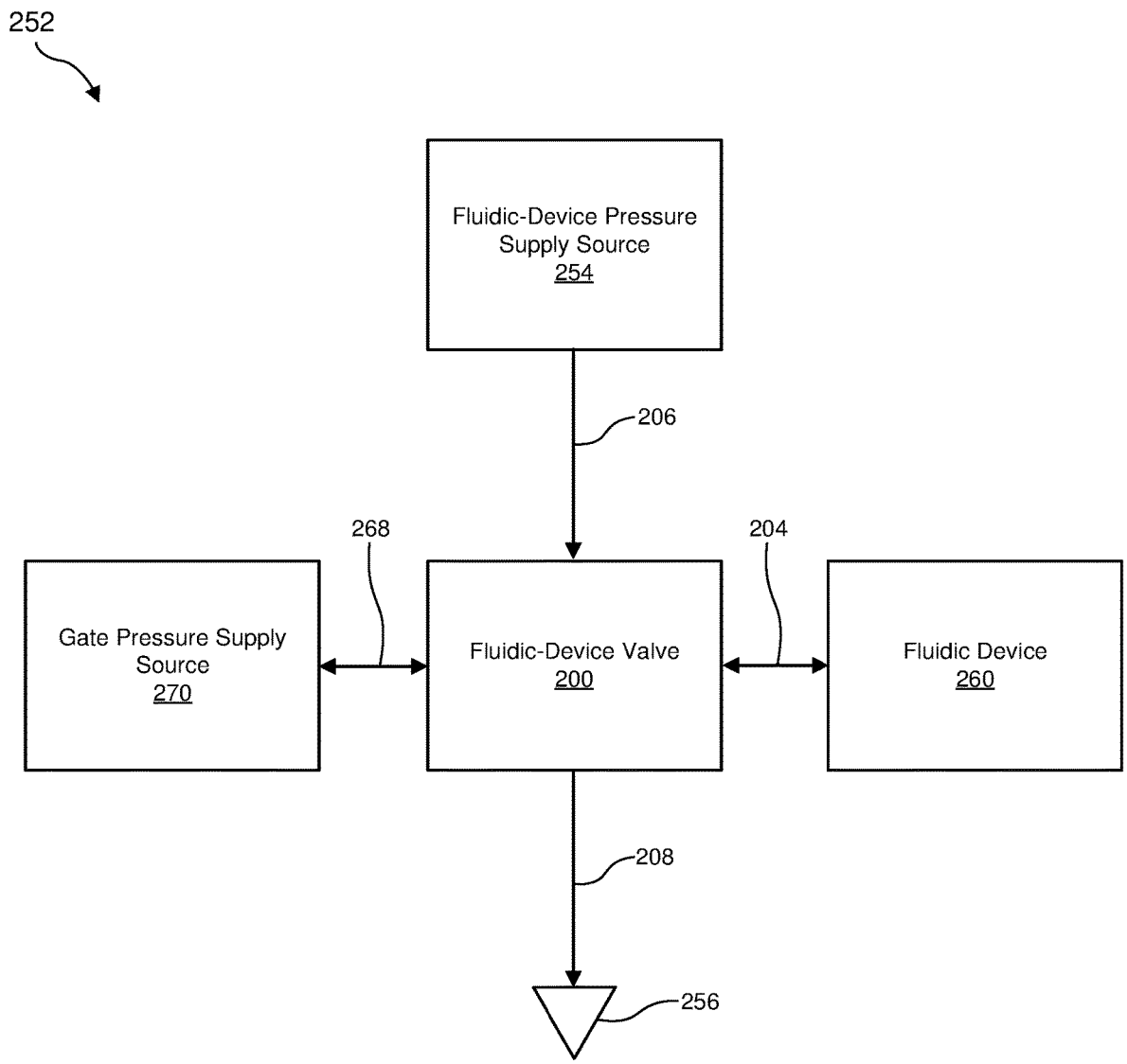
FIG. 6 is a block diagram of an exemplary fluidic system in accordance with some embodiments.

FIG. 6 illustrates an exemplary fluidic system 252 that includes a fluidic-device valve 200 (see FIGS. 5A-5C) according to some embodiments. As shown in FIG. 6, a fluidic device 260 may be in fluid communication with fluidic-device valve 200 via central line 204, a fluidic-device pressure supply source 254 may be in fluid communication with fluidic-device valve 200 via first branch line 206, and a pressure ground 256 may be in fluid communication with fluidic-device valve 200 via second branch line 208. Pressurized fluid from fluidic-device pressure supply source 254 may be selectively delivered to fluidic device 260 by fluidic-device valve 200, which may change a fluid source and/or destination line (i.e., between first branch line 206 and second branch line 208) that is in fluid communication with central line 204 as shown in FIGS. 5A and 5B. When a state of fluidic-device valve 200 is changed such that pressure ground 256 is in fluid communication with fluidic device 260, pressurized fluid from fluidic device 260 may be directed from fluidic device 260 to pressure ground 256 such that the pressure exerted on fluidic device 260 is reduced, resulting, for example, in fluidic device 260 being returned to a non-actuated state.

Fluidic system 252 may also include a gate pressure supply source 270 that controls a state of fluidic-device valve 200 as shown in FIG. 6. For example, gate pressure supply source 270 may control fluidic-device valve 200 by selectively supplying a pressured fluid having a first elevated pressure $P_1$ (see FIG. 5A) or a second elevated pressure $P_2$ (see FIG. 5C) to fluidic-device valve 200 via gate line 268 to change the position of a valve member 222 of fluidic-device valve 200, thereby altering a flow path through fluidic-device valve 200. Accordingly, gate pressure supply source 270 may switch the flow path through fluidic-device valve 200 such that fluidic device 260 is in fluid communication with fluidic-device pressure supply source 254 and/or pressure ground 256.

Figure 7:
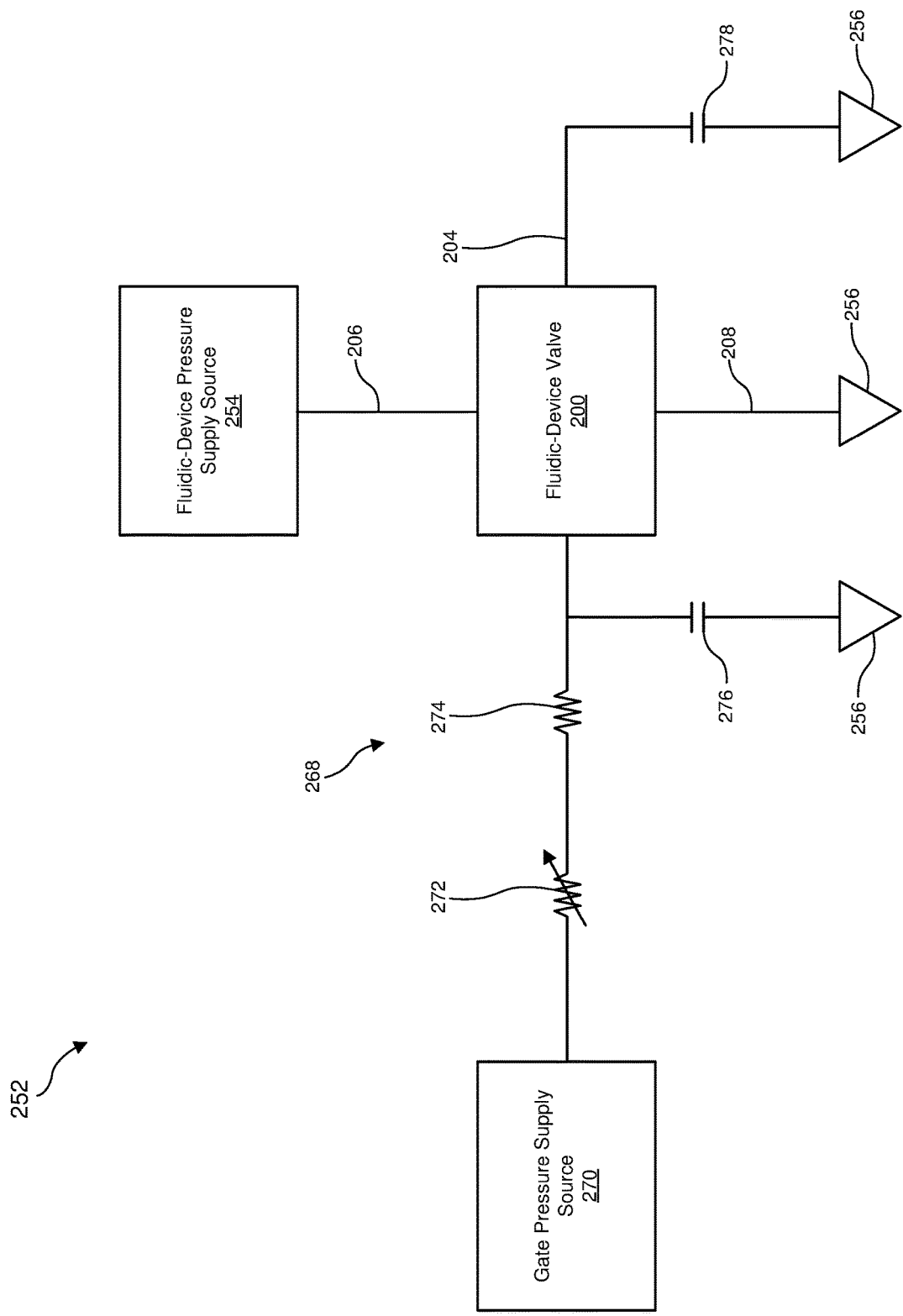
FIG. 7 is a schematic diagram of an exemplary fluidic system in accordance with some embodiments.

FIG. 7 is a schematic diagram of fluidic system 252 shown in FIG. 6. FIG. 7 illustrates various fluidic elements in accordance with some embodiments. As shown in this figure, fluidic system 252 may include a pressure-supply valve 272 between gate pressure supply source 270 and fluidic-device valve 200. Pressure-supply valve 272 may be any suitable type of valve that controls flow of a pressurized fluid from gate pressure supply source 270, such as, for example, an electromagnetically-actuated valve and/or any other suitable valve type. FIG. 7 illustrates a gate-line resistance 274 representing a resistance of gate line 268 between gate pressure supply source 270. Gate-line resistance 274 may, for example, corresponds to a loss in the pressure (i.e., head loss) of the pressurized fluid from gate pressure supply source 270 as it flows through gate line 268 to fluidic-device valve 200. The amount of resistance may be correlated to the length and width of gate line 268 and the thickness of valve member 222 (in a direction perpendicular to central axis 220) (see FIGS. 5A-5C).

FIG. 7 also illustrates a gate-line capacitance 276 in gate line 268 with respect to a pressure ground 256. For example, pressurized fluid from gate pressure supply source 270 may produce gate-line capacitance 276 within gate line 268 corresponding to the quantity of pressurized fluid volume within gate line 268 utilized to move valve member 222 of fluidic-device valve 200. Additionally, a fluidic-device capacitance 278 of central line 204 with respect to pressure ground 256 is illustrated. For example, pressurized fluid from fluidic-device pressure supply source 254 directed through central line 204 to actuate fluidic device 260 (see FIG. 6) may produce fluidic-device capacitance 278 within central line 204 corresponding to the quantity of pressurized fluid volume within central line 204 utilized to actuate fluidic device 260. In some embodiments, a load applied to an actuator of fluidic device 260 in a non-actuated state may be below approximately 15 kPa, while a load applied to the actuator of fluidic device 260 to actuate fluidic device 260 may be at least approximately 100 kPa (e.g., between approximately 100 kPa and approximately 200 kPa).

Figure 8A:
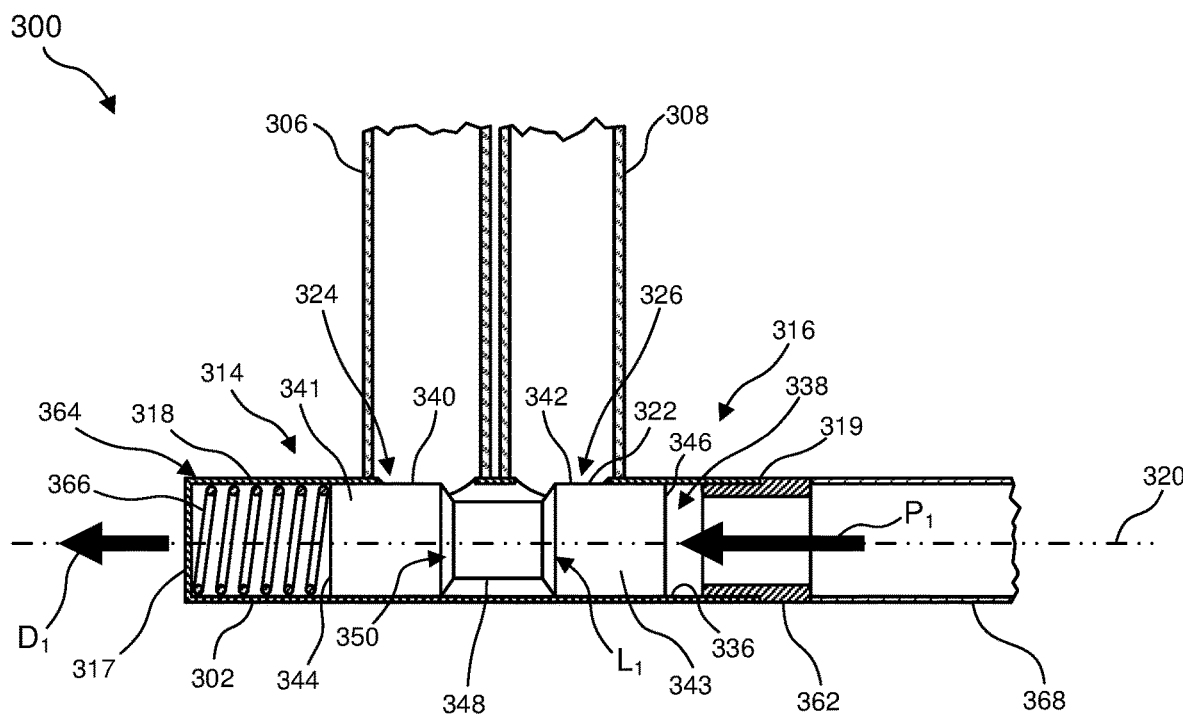
FIG. 8A is a partial cross-sectional side view of an exemplary fluidic-device valve in accordance with some embodiments.
Figure 8B:
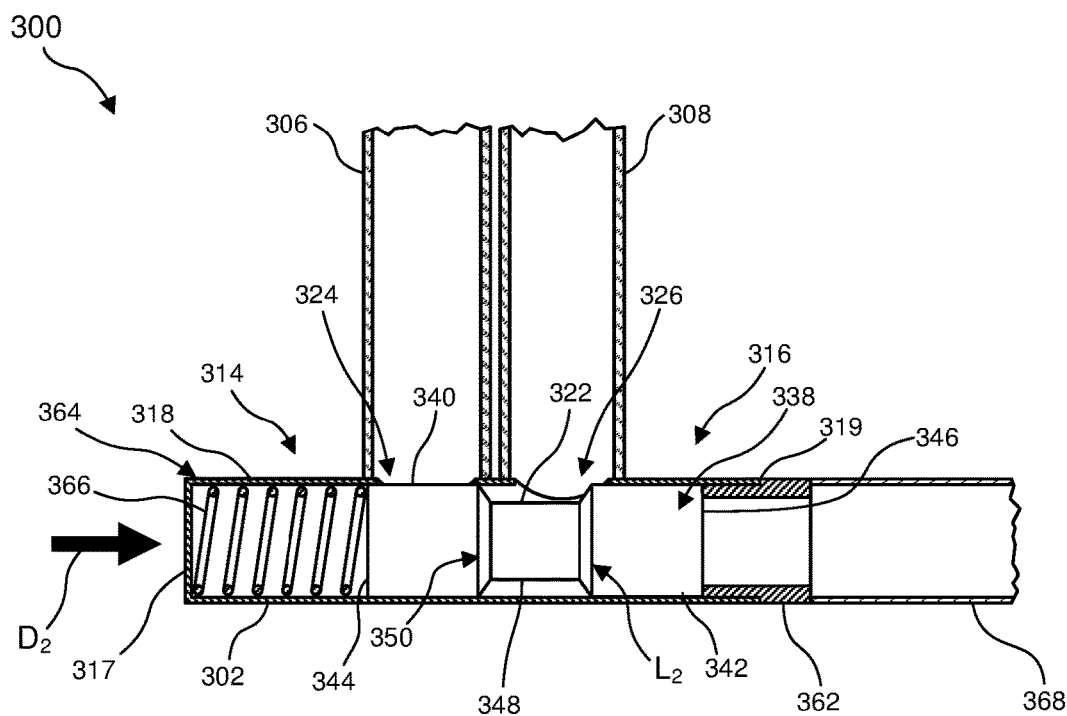
FIG. 8B is a partial cross-sectional side view of the fluidic-device valve of FIG. 8A in accordance with some embodiments.

FIGS. 8A and 8B show partial cross-sectional views of an exemplary fluidic-device valve 300 in accordance with some embodiments. Fluidic-device valve 300 generally represents any type or form of valve device, such as a 2-way valve, that may be utilized in fluidic systems including one or more fluidic devices. Fluidic-device valve 300 may be actuated to selectively direct fluid from one or more sources to one or more outputs.

As shown in these figures, fluidic-device valve 300 may include a valve guide 302 and a plurality of fluid lines, including a first branch line 306 and a second branch line 308, coupled to valve guide 302. Valve guide 302 may have a first guide section 314 and a second guide section 316 on first and second sides of first branch line 306 and second branch line 308, respectively. Valve guide 302 may include a guide wall 318 surrounding and longitudinally extending along a central axis 320 between a first end 317 and a second end 319 of valve guide 302. A valve member 322 may be disposed within a valve cavity 338 defined by an interior surface 336 of guide wall 318. In some examples, fluidic-device valve 300 may include a stopper 362 at second end 319. Various openings corresponding to fluid lines coupled to valve guide 302 may be defined in guide wall 318. For example, a first branch opening 323 and a second branch opening 324 respectively corresponding with first branch line 306 and second branch line 308 may be defined in guide wall 318 at locations between first guide section 314 and second guide section 316.

In various embodiments, valve member 322 may include a first plug section 340 and a second plug section 342 having outer surfaces 341 and 343, respectively. Outer surfaces 341 and 343 may each be cylindrical or substantially cylindrical and/or any other suitable surface shape. First plug section 340 and second plug section 342 may be disposed apart from each other along central axis 320. Outer surface 341 and outer surface 343 may correspond to and abut interior surface 336, allowing valve member 322 to move within valve cavity 338 along central axis 320 within valve cavity 338. For example, first plug section 340 may abut interior surface 336 at first guide section 314 of valve guide 302 and second plug section 342 may abut interior surface 336 at second guide section 316 of valve guide 302. Valve member 322 may extend longitudinally along central axis 320 between a first end 344 and a second end 346 of valve member 322. Additionally, valve member 322 may include a reduced diameter section 348 disposed between first plug section 340 and second plug section 342. Reduced diameter section 348 may have a smaller diameter about central axis 320 than each of first plug section 340 and second plug section 342 such that reduced diameter section 348 is separated from interior surface 336 of valve guide 302. Reduced diameter section 348 may have any suitable surface shape, including, for example, a cylindrical or substantially cylindrical shape and/or any other suitable shape. Reduced diameter section 348 together with adjacent end portions of first plug section 340 and second plug section 342 may define a fluid conduit 350 between first plug section 340 and second plug section 342. First plug section 340 and second plug section 342, which closely abut and/or contact interior surface 336, may prevent or inhibit passage of fluid through portions of valve cavity 338, while fluid conduit 350 may selectively enable passage of fluid through corresponding portions of valve cavity 338.

According to some embodiments, a gate line 368 may be coupled to valve guide 302 at, for example, stopper 362 and/or second guide section 316 (e.g., at or near second end 319 of valve guide 302), as shown in FIGS. 8A and 8B. Stopper 362 may define a hole permitting fluid communication between gate line 368 and valve cavity 338. Additionally, as shown these figures, fluidic-device valve 300 may include a biasing mechanism 364 in first guide section 314 of valve guide 302 at a location between first end 344 of valve member 322 and first end 317 of valve guide 302. For example, biasing mechanism 364 may include a spring 366, such as a compression spring and/or any other suitable type of spring, disposed between first end 344 of valve member 322 and first end 317 of valve guide 302. Additionally or alternatively, biasing mechanism 364 may include an enclosed medium (e.g., a gas, an elastically compressible material, such as a compressible foam material, etc.) disposed between first end 344 of valve member 322 and first end 317 of valve guide 302.

In at least one embodiment, as shown in FIG. 8A, a first elevated pressure $P_1$ may be selectively applied to second guide section 316 of valve guide 302 by a pressure source via gate line 368 such that first elevated pressure $P_1$ is applied against second end 346 of valve member 322, forcing movement of valve member 322 in a first axial direction $D_1$ along central axis 320 such that fluid conduit 350 is positioned, for example, at a first location $L_1$ within valve guide 302 as illustrated in FIG. 8A. As valve member 322 is forced in first axial direction $D_1$ by first elevated pressure $P_1$, spring 366 and/or an enclosed medium of biasing mechanism 364 may be compressed between first end 344 of valve member 322 and first end 317 and of valve guide 302. Spring 366 and/or the enclosed medium may exert a force against first end 344 of valve member 322 in a second axial direction $D_2$ (see FIG. 8B) opposite first axial direction $D_1$. As shown in FIG. 8A, when fluid conduit 350 of valve member 322 is positioned at first location $L_1$, first branch line 306 may be in fluid communication with second branch line 308 via fluid conduit 350 such that fluid conduit 350 provides a fluid path through valve guide 302 between second branch line 308 and first branch line 306.

In some embodiments, as shown in FIG. 8B, a pressure applied to second guide section 316 of valve guide 302 via gate line 368 may be reduced such that a pressure (e.g., a ground pressure) that is lower than first elevated pressure $P_1$ is applied against second end 346 of valve member 322. As the pressure exerted against second end 346 of valve member 322 is reduced, a force applied by spring 366 and/or an enclosed medium of biasing mechanism 364 against first end 344 of valve member 322 may be sufficient to move valve member 322 in second axial direction $D_2$ opposite first axial direction $D_1$ along central axis 320 such that fluid conduit 350 is positioned, for example, at a second location $L_2$ within valve guide 302. As shown in FIG. 8B, when fluid conduit 350 of valve member 322 is positioned at second location $L_2$, first branch line 306 may not be in fluid communication with second branch line 308. For example, when fluid conduit 350 of valve member 322 is positioned at second location $L_2$, first plug section 340 of valve member 322 may cover or substantially cover first branch opening 323 such that flow of a fluid from first branch line 306 into valve cavity 338 is blocked or inhibited. In some embodiments, an electromagnetic coil assembly, such as first electromagnetic coil assembly 110 and/or second electromagnetic coil assembly 112 illustrated in FIGS. 1A-3C, may be utilized in fluidic-device valve 300 to additionally or alternatively drive movement of valve member 322 in direction $D_1$ and/or direction $D_2$ shown in FIGS. 8A and 8B.

Figure 9A:
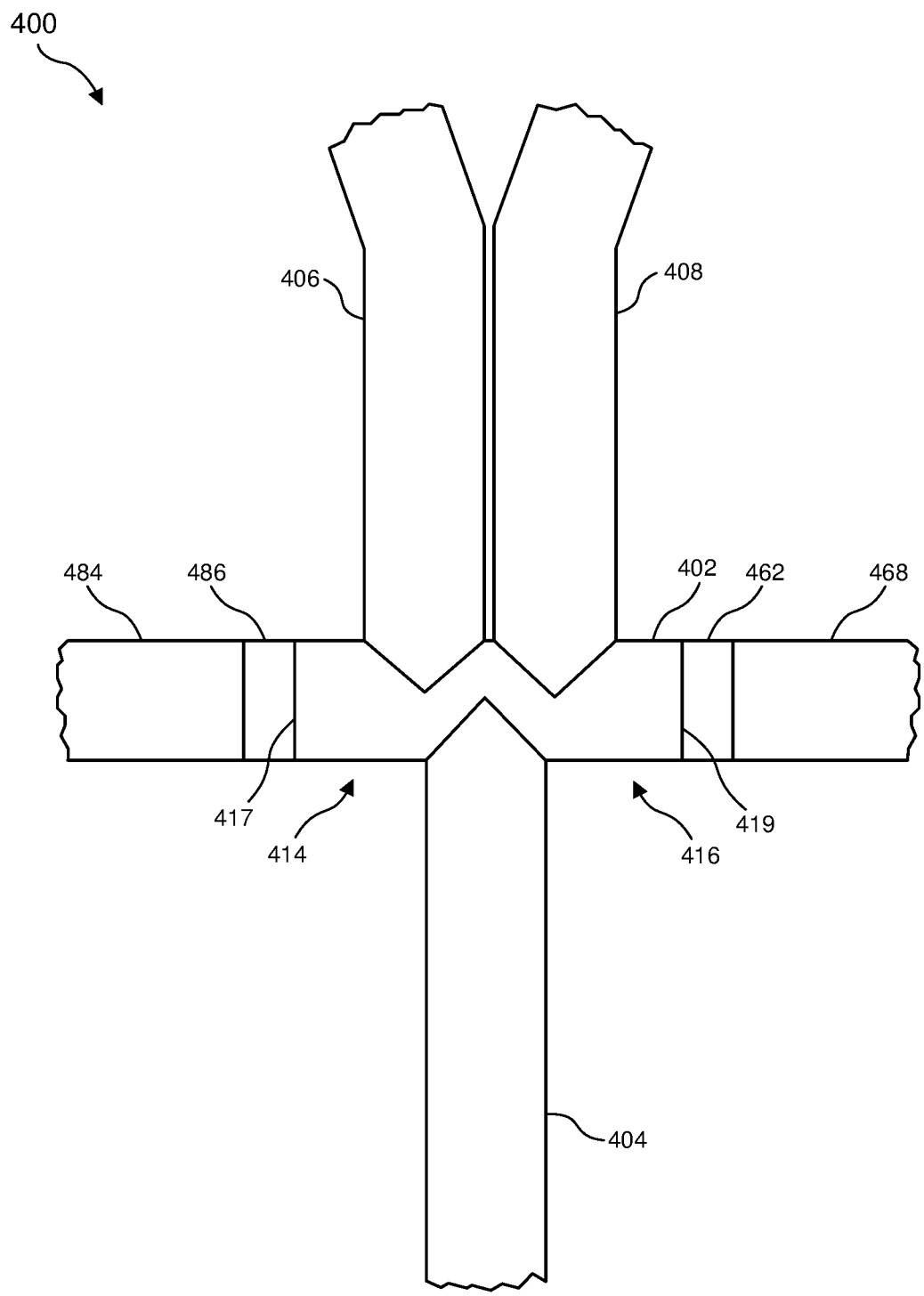
FIG. 9A is a side view of an exemplary fluidic-device valve in accordance with some embodiments.
Figure 9B:
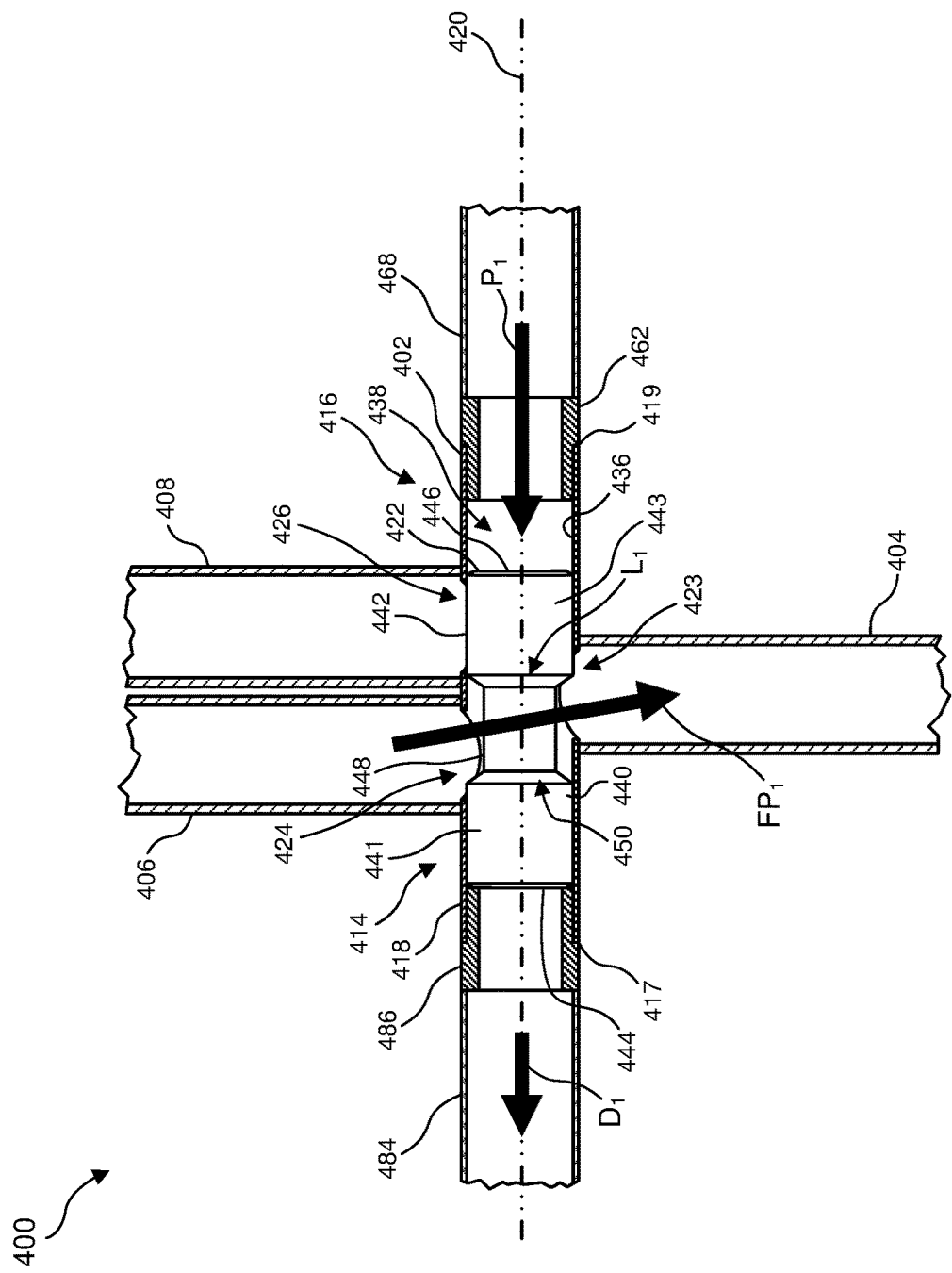
FIG. 9B is a partial cross-sectional side view of the fluidic-device valve of FIG. 9A in accordance with some embodiments.
Figure 9C:
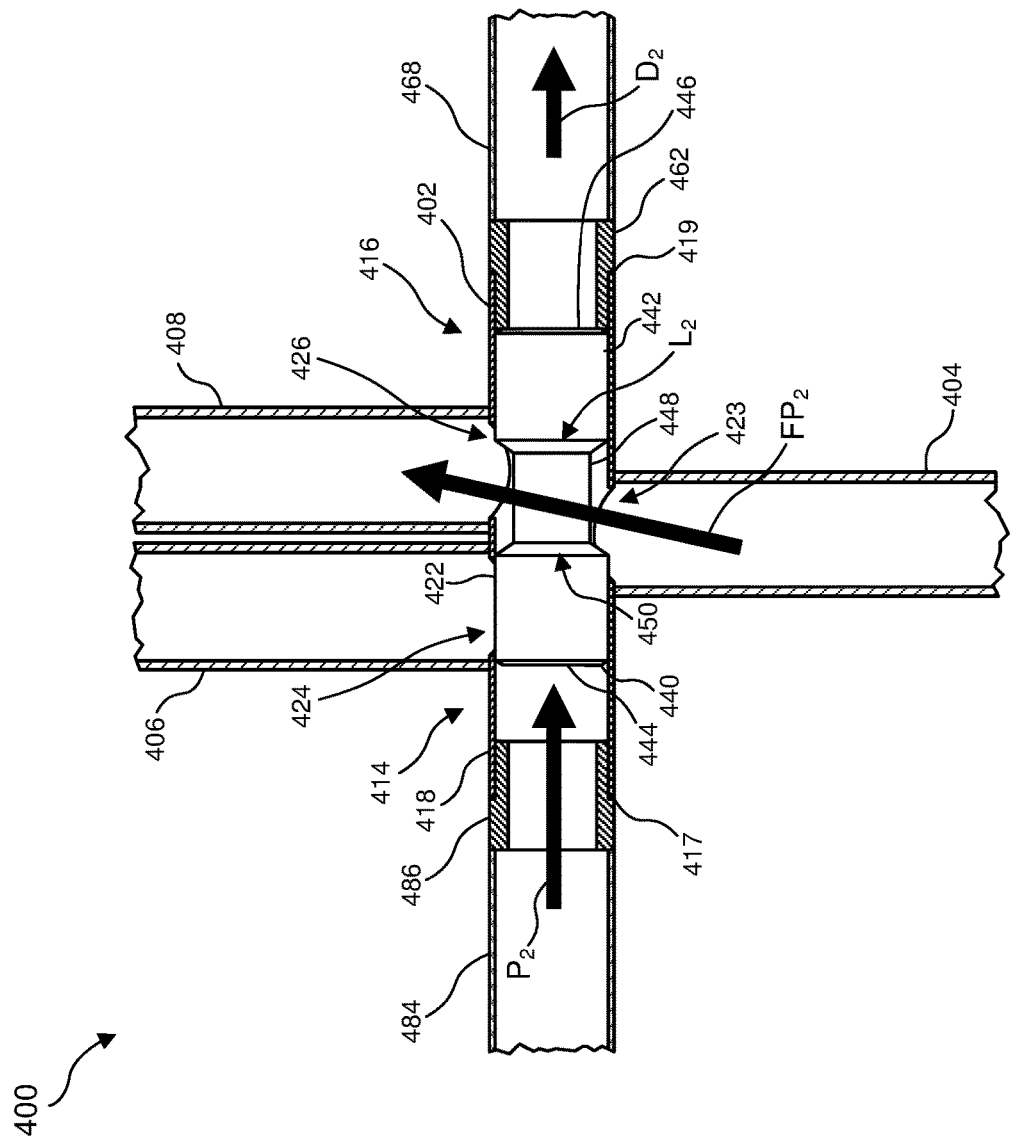
FIG. 9C is a partial cross-sectional side view of the fluidic-device valve of FIG. 9A in accordance with some embodiments.

FIGS. 9A-9C show views of an exemplary fluidic-device valve 400 in accordance with some embodiments. Fluidic-device valve 400 generally represents any type or form of valve device, such as a 3-way valve, that may be utilized in fluidic systems including one or more fluidic devices. Fluidic-device valve 400 may be actuated to selectively direct fluid from one or more sources to one or more outputs.

As shown in these figures, fluidic-device valve 400 may include a valve guide 402 and a plurality of fluid lines, including a central line 404, a first branch line 406, and a second branch line 408, coupled to valve guide 402. Valve guide 402 may have a first guide section 414 and a second guide section 416 on first and second sides of central line 404, first branch line 406, and second branch line 408, respectively. Valve guide 402 may include a guide wall 418 surrounding and longitudinally extending along a central axis 420 between a first end 417 and a second end 419 of valve guide 402 as shown in FIG. 9B. A valve member 422 may be disposed within a valve cavity 438 defined by an interior surface 436 of guide wall 418. In some examples, fluidic-device valve 400 may include a first stopper 486 at first end 417 and a second stopper 462 at second end 419. For example, first stopper 486 and second stopper 462 may have portions disposed within and contacting corresponding portions of interior surface 436 at first end 417 and second end 419, respectively. First stopper 486 and second stopper 462 may have narrower inner diameters than interior surface 436, allowing movement of valve member 422 along central axis 420 between first stopper 486 and second stopper 462 and preventing movement of valve member 422 beyond first stopper 486 and second stopper 462. Various openings corresponding to fluid lines coupled to valve guide 402 may be defined in guide wall 418. For example, a central opening 423, a first branch opening 424, and a second branch opening 426 respectively corresponding with central line 404, first branch line 406, and second branch line 408 may be defined in guide wall 418 at locations between first guide section 414 and second guide section 416.

Valve member 422 may include a first plug section 440 and a second plug section 442 having outer surfaces 441 and 443, respectively. Outer surfaces 441 and 443 may each be cylindrical or substantially cylindrical and/or any other suitable surface shape. First plug section 440 and second plug section 442 may be disposed apart from each other along central axis 420. Outer surface 441 and outer surface 443 may correspond to and abut interior surface 436, allowing valve member 422 to move within valve cavity 438 along central axis 420 within valve cavity 438 between first stopper 486 and second stopper 462. Valve member 422 may extend longitudinally along central axis 420 between a first end 444 and a second end 446 of valve member 422. Additionally, valve member 422 may include a reduced diameter section 448 disposed between first plug section 440 and second plug section 442. Reduced diameter section 448 together with adjacent end portions of first plug section 440 and second plug section 442 may define a fluid conduit 450 between first plug section 440 and second plug section 442.

According to some embodiments, a first gate line 484 may be coupled to valve guide 402 at, for example, first stopper 486 and/or first guide section 414 (e.g., at or near first end 417 of valve guide 402), as shown in FIGS. 9A-9C. First stopper 486 may define a hole permitting fluid communication between first gate line 484 and valve cavity 438. Additionally, as shown these figures, a second gate line 468 may be coupled to valve guide 402 at, for example, second stopper 462 and/or second guide section 416 (e.g., at or near second end 419 of valve guide 402). Second stopper 462 may define a hole permitting fluid communication between second gate line 468 and valve cavity 438. In at least one embodiment, as shown in FIG. 9B, a first elevated pressure $P_1$ may be selectively applied to second guide section 416 of valve guide 402 by a pressure source via second gate line 468 such that first elevated pressure $P_1$ is applied against second end 446 of valve member 422, forcing movement of valve member 422 in a first axial direction $D_1$ along central axis 420 such that fluid conduit 450 is positioned, for example, at a first location $L_1$ within valve guide 402 as illustrated in FIG. 9B. As first elevated pressure $P_1$ is applied via second gate line 468 to second end 446 of valve member 422, a lower pressure may be applied via first gate line 484 to first end 444 of valve member 422. As shown in FIG. 9B, when fluid conduit 450 of valve member 422 is positioned at first location $L_1$, central line 404 may be in fluid communication with first branch line 406 via fluid conduit 450 such that fluid conduit 450 provides a fluid path $FP_1$ through valve guide 402 between first branch line 406 and central line 404. Additionally, when fluid conduit 450 of valve member 422 is positioned at first location $L_1$, second plug section 442 of valve member 422 may cover or substantially cover second branch opening 426 such that flow of a fluid between second branch line 408 and valve cavity 438 is blocked or inhibited.

In at least one embodiment, as shown in FIG. 9C, a pressure applied to second guide section 416 of valve guide 402 via second gate line 468 may be reduced such that a pressure (e.g., a ground pressure) that is lower than first elevated pressure $P_1$ is applied against second end 446 of valve member 422. Additionally, a second elevated pressure $P_2$ (e.g., an elevated pressure substantially the same as or different than first elevated pressure $P_1$) may be selectively applied to first guide section 414 of valve guide 402 by a pressure source via first gate line 484 such that second elevated pressure $P_2$ is applied against first end 444 of valve member 422, forcing movement of valve member 422 in a second axial direction $D_2$ opposite first axial direction $D_1$ along central axis 420 such that fluid conduit 450 is positioned, for example, at a second location $L_2$ within valve guide 402. As shown in FIG. 9C, when fluid conduit 450 of valve member 422 is positioned at second location $L_2$, central line 404 may be in fluid communication with second branch line 408 via fluid conduit 450 such that fluid conduit 450 provides a fluid path $FP_2$ through valve guide 402 between central line 404 and second branch line 408. Additionally, when fluid conduit 450 of valve member 422 is positioned at second location $L_2$, first plug section 440 of valve member 422 may cover or substantially cover first branch opening 424 such that flow of a fluid from first branch line 406 into valve cavity 438 is blocked or inhibited. In some examples, valve member 422 may be positioned at an intermediate location between first location $L_1$ and second location $L_2$ such that fluid conduit 450 enables simultaneous passage of fluid between central line 104 and each of first branch line 106 and second branch line 108 (see, e.g., FIG. 5C). In some embodiments, an electromagnetic coil assembly, such as first electromagnetic coil assembly 110 and/or second electromagnetic coil assembly 112 illustrated in FIGS. 1A-3C, may be utilized in fluidic-device valve 400 to additionally or alternatively drive movement of valve member 422 in direction $D_1$ and/or direction $D_2$ shown in FIGS. 9B and 9C.

Figure 10:
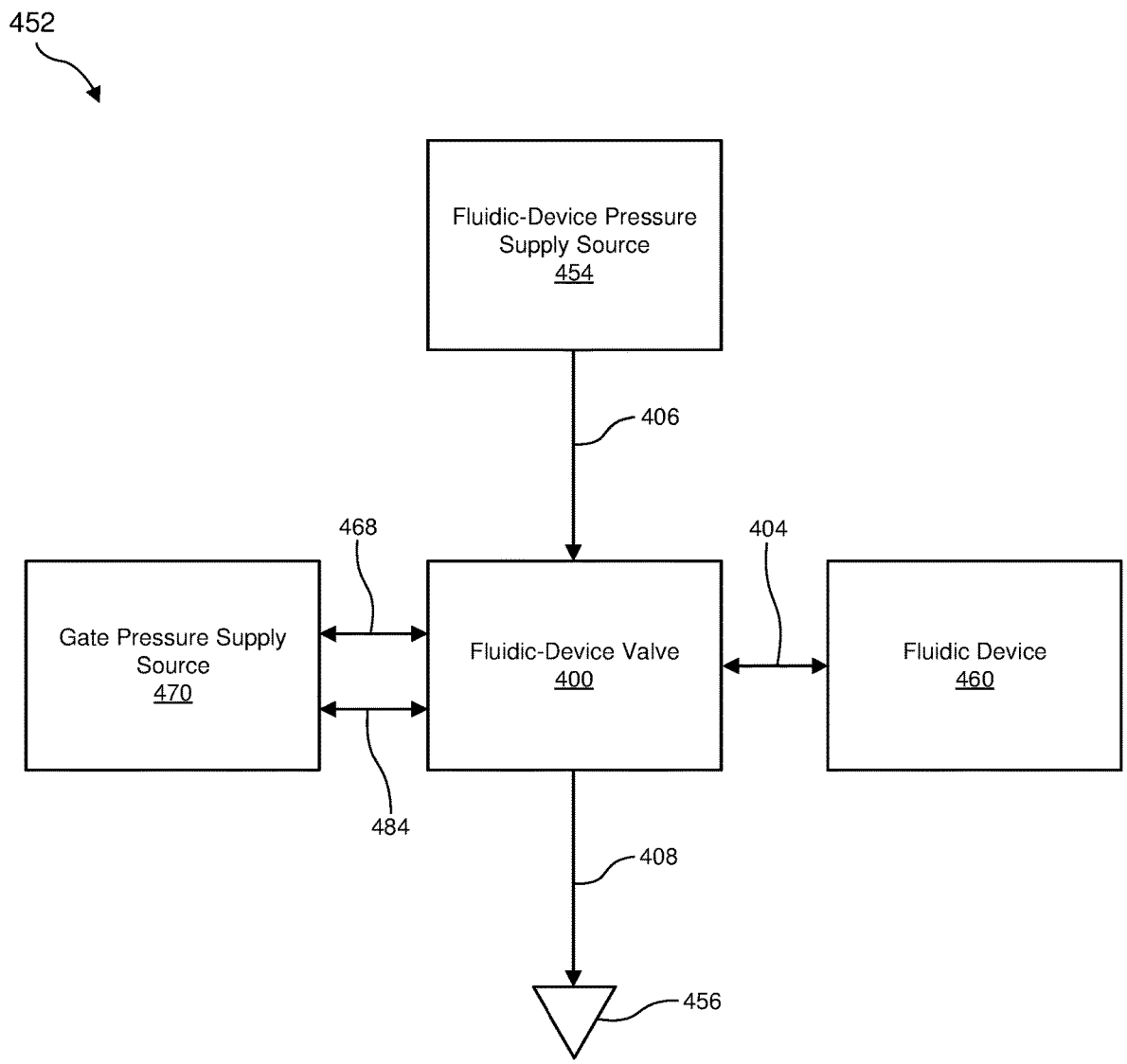
FIG. 10 is a block diagram of an exemplary fluidic system in accordance with some embodiments.

FIG. 10 illustrates an exemplary fluidic system 452 that includes a fluidic-device valve 400 (see FIGS. 9A-9C) according to some embodiments. As shown in FIG. 10, a fluidic device 460 may be in fluid communication with fluidic-device valve 400 via central line 404, fluidic-device pressure supply source 454 may be in fluid communication with fluidic-device valve 400 via first branch line 406, and pressure ground 456 may be in fluid communication with fluidic-device valve 400 via second branch line 408. Pressurized fluid from fluidic-device pressure supply source 454 may be selectively delivered to fluidic device 460 by fluidic-device valve 400, which may change a fluid source and/or destination line (i.e., between first branch line 406 and second branch line 408) that is in fluid communication with central line 404 as shown in FIGS. 9B and 9C. When a state of fluidic-device valve 400 is changed such that pressure ground 456 is in fluid communication with fluidic device 460, pressurized fluid from fluidic device 460 may be directed from fluidic device 460 to pressure ground 456 such that the pressure exerted on fluidic device 460 is reduced, resulting, for example, in fluidic device 460 being returned to a non-actuated state.

Fluidic system 452 may also include a gate-pressure supply source 470 (or multiple gate-pressure supply sources) that controls a state of fluidic-device valve 400 as shown in FIG. 10. For example, gate-pressure supply source 470 may control fluidic-device valve 400 by selectively supplying a pressured fluid having a first elevated pressure $P_1$ to fluidic-device valve 400 via second gate line 468 (see FIG. 9B) or a pressured fluid having a second elevated pressure $P_2$ to fluidic-device valve 400 via first gate line 484 (see FIG. 9C) to change the position of a valve member 422 of fluidic-device valve 400, thereby altering a flow path through fluidic-device valve 400. Accordingly, gate-pressure supply source 470 may switch the flow path through fluidic-device valve 400 such that fluidic device 460 is in fluid communication with fluidic-device pressure supply source 454 and/or pressure ground 456.

Figure 11:
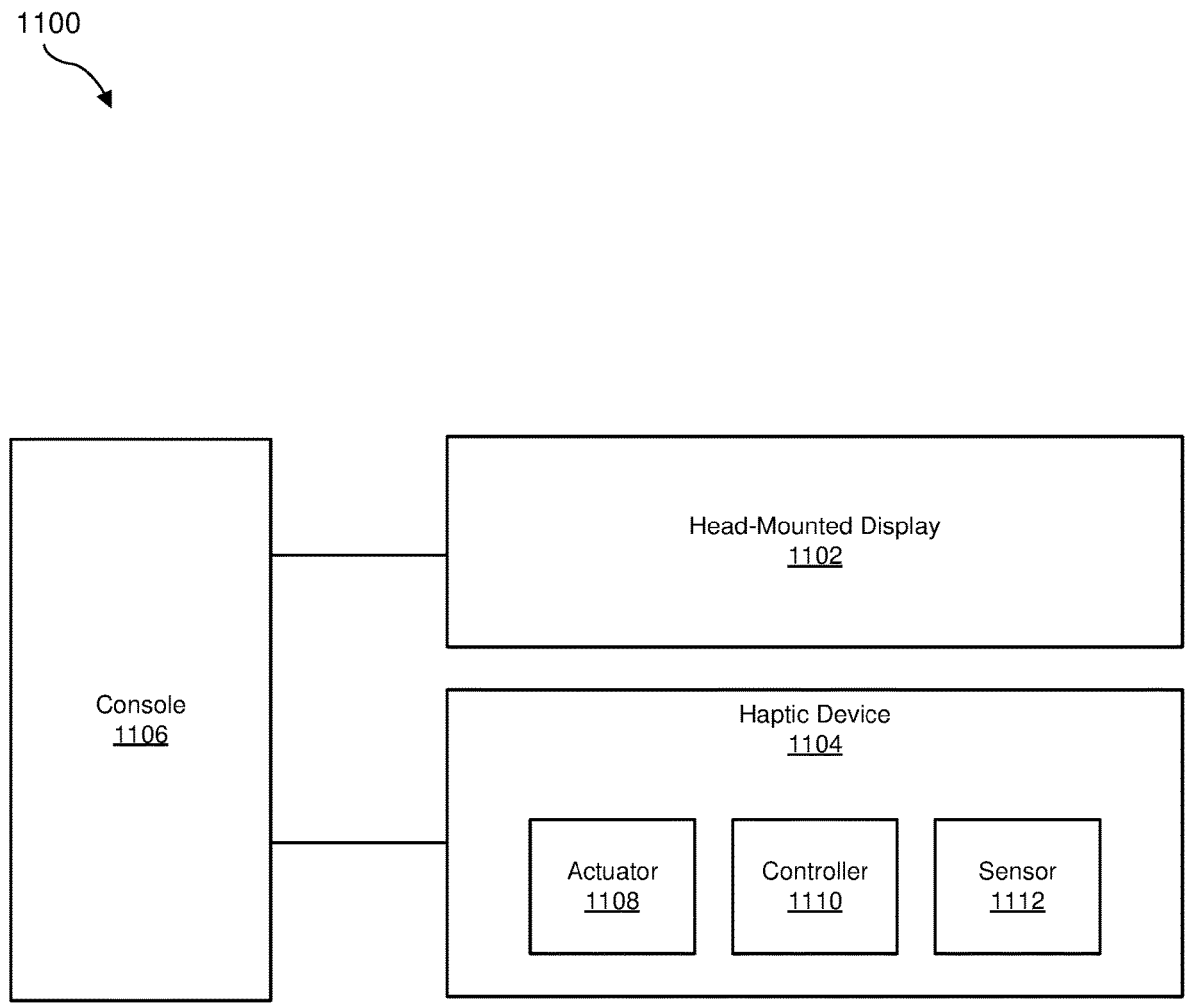
FIG. 11 is a block diagram of an exemplary artificial reality system that includes one or more fluidic devices in accordance with some embodiments.
Figure 12:
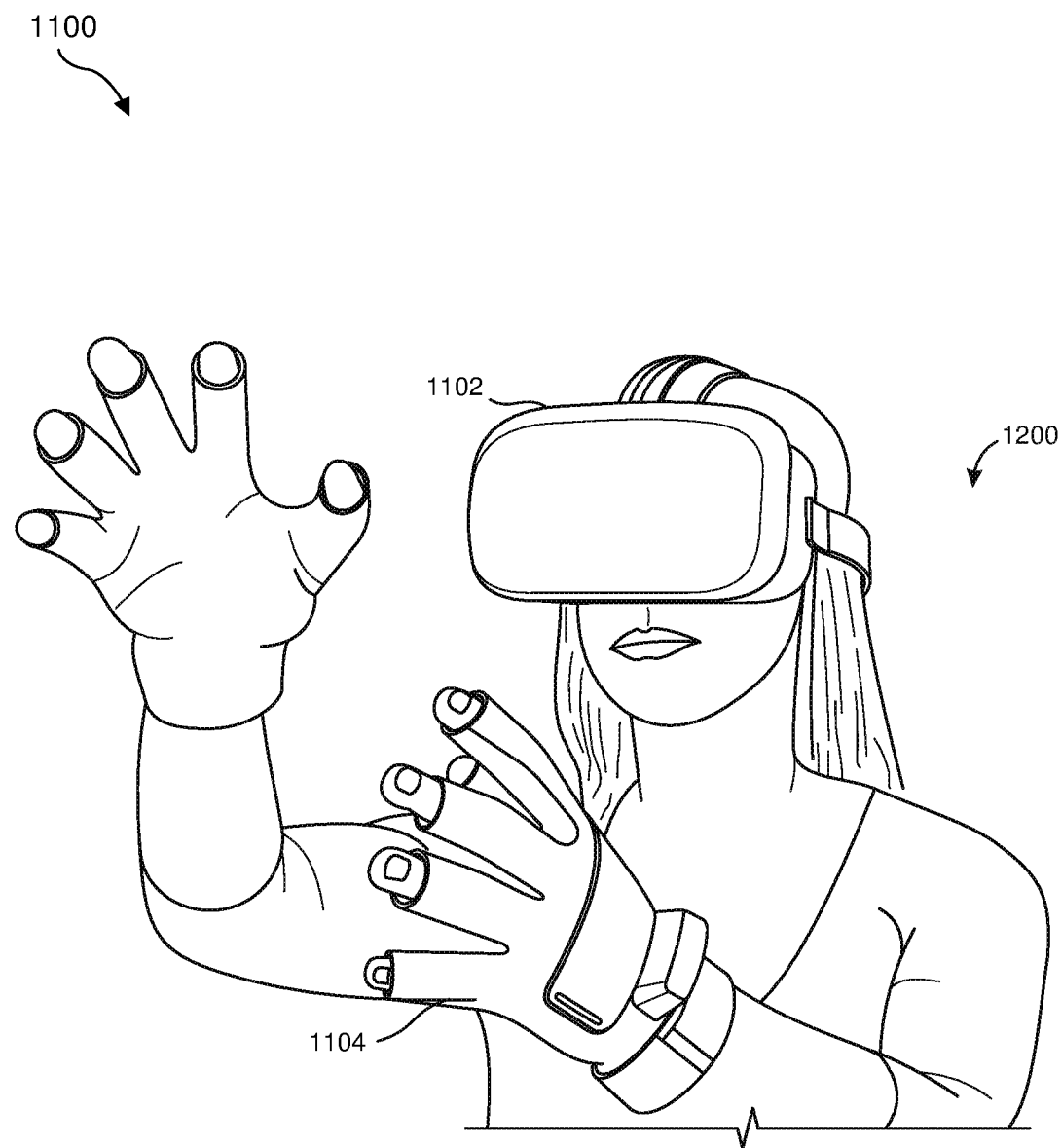
FIG. 12 is a perspective view of a user wearing an exemplary head-mounted display and an exemplary haptic glove within an artificial reality system in accordance with some embodiments.

FIG. 11 is a block diagram of an exemplary artificial reality system 1100 that includes a head-mounted display 1102 and a haptic device 1104, each of which may be coupled to a console 1106. In some embodiments, console 1106 may be integrally incorporated in head-mounted display 1102. In some examples, a user may wear head-mounted display 1102 around his or her head and/or may wear haptic device 1104 (e.g., as a glove on one or both hands), as illustrated in FIG. 12. FIG. 12 is a perspective illustration of an exemplary embodiment of artificial reality system 1100 in which a user 1200 is wearing an exemplary embodiment of head-mounted display 1102 and haptic device 1104.

While FIG. 11 shows an example artificial reality system including one head-mounted display and one haptic assembly, and FIG. 12 shows an example artificial reality environment including one head-mounted display and two haptic devices, in other embodiments any number of these components may be included in an artificial reality system. For example, in some embodiments there may be multiple head-mounted displays each having an associated haptic device, with each head-mounted display and each haptic device communicating with the same console.

Head-mounted display 1102 generally represents any type or form of assembly configured to present media representing an artificial reality to a user wearing the assembly. Examples of media presented by head-mounted display 1102 include, without limitation, one or more images, video, and/or audio. In one example, audio may be presented via an external device (e.g., speakers and/or headphones) that receives audio information from head-mounted display 1102 and/or console 1106 and presents audio data via the external device based on the audio information.

In some embodiments, head-mounted display 1102 may represent a virtual reality headset. In these embodiments, head-mounted display 1102 may present views (e.g., images, video, sound, etc.) of a computer-generated reality. Additionally or alternatively, head-mounted display 1102 may represent an augmented reality (AR) and/or mixed reality (MR) headset. In these embodiments, head-mounted display 1102 augments views of a physical, real-world environment with computer-generated elements (e.g., images, video, sound, etc.).

Haptic device 1104 generally represents any type or form of wearable device, worn by a user within an artificial reality system, that provides haptic feedback to the user to give the user the perception that he or she is physically engaging with a virtual object. In some embodiments, haptic device 1104 may provide haptic feedback by applying a vibration, motion, and/or force to the user. For example, haptic device 1104 may limit or augment a user's movement. To give a specific example, haptic device 1104 may limit a user's hand from moving forward so that the user has the perception that his or her hand has come in physical contact with a virtual wall. In this specific example, one or more actuators within the haptic advice may achieve the physical movement restriction by pumping fluid into an inflatable bladder of the haptic device. In some examples, a user may also use haptic device 1104 to send action requests to console 1106. Examples of action requests include, without limitation, requests to start an application and/or end the application and/or requests to perform a particular action within the application.

In some embodiments, haptic device 1104 may include a combination of various coupled fluidic devices, including, for example, fluidic-device valves as described herein. In one example, a circuitry within haptic device 1104 may consist primarily or exclusively of fluidic devices. Alternatively, the circuitry within haptic device 1104 may include a combination of fluidic devices and electrical devices, forming a combined fluidic/non-fluidic haptic device. The fluidic devices may be used to perform a variety of actions. For example, one or more fluidic devices may operate as a controller 1110 (e.g., addressing actuators included in haptic device 1104 according to a haptic feedback signal from console 1106). In another example, one or more fluidic devices may act as a sensor 1112 and/or as an actuator 1108 within haptic device 1104.

Figure 13:
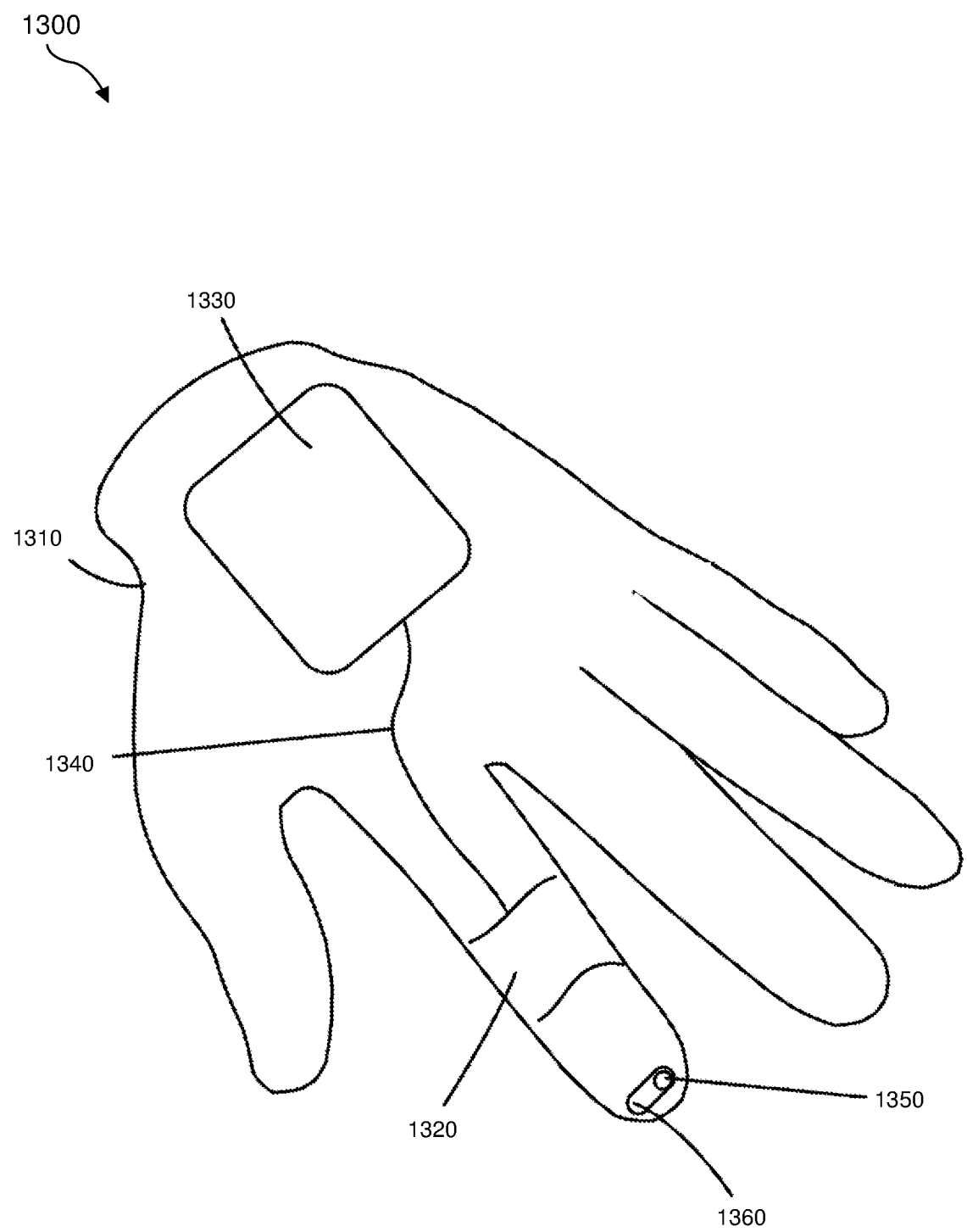
FIG. 13 is a perspective view of the exemplary haptic glove in accordance with some embodiments.

To give a specific simplified example of a fluidic circuitry operating within a haptic device, FIG. 13 illustrates an exemplary haptic glove 1300 with an assembly of interconnected fluidic devices configured to perform a variety of tasks. As shown in FIG. 13, haptic glove 1300 may be formed by a glove body 1310. In some examples, glove body 1310 may represent a garment and may be coupled to an assembly of haptic components such as an actuator 1320, a controller 1330, a signaling path 1340, a group of position sensors (including position sensor 1350), and/or one or more inertial measurement units (IMU) (including IMU 1360).

In some embodiments, one or more of these haptic components may be placed beneath an outer surface of glove body 1310, shielded from view. Additionally or alternatively, one or more of the haptic components may be placed on an outer surface of glove body 1310, such that the haptic components are visually detectable. In one example, position sensor 1350 may be coupled to a portion of glove body 1310 corresponding to a fingertip, as shown in FIG. 12. In this embodiment, (1) actuator 1320 may be coupled to a portion of glove body 1310 corresponding to a finger joint, (2) controller 1330 may be coupled to a portion of glove body 1310 corresponding to a dorsal side of a hand, and (3) signaling path 1340 may be coupled between controller 1330 and actuator 1320, as shown in FIG. 13.

In one example, the haptic assembly in FIG. 13 may be configured to collect location and/or motion data describing a physical position and/or movement of haptic glove 1300. In this example, position sensor 1350 may generate measurement signals in response to motion of haptic glove 1300. Position sensor 1350 may, in some embodiments, represent an accelerometer and/or a gyroscope that has at least one fluidic component. After generating the measurement signals, position sensor 1350 may transmit the measurement signals to IMU 1360. Then, IMU 1360 may rapidly sample the measurement signals (e.g., from position sensor 1350 and other position sensors within haptic glove 1300) and calculate the estimated position of haptic glove 1300 from the sampled measurements or transmit the sampled measurements to the console for the console to calculate the estimated position of haptic glove 1300. In this example, position sensor 1350 and/or IMU 1360 may be composed, at least in part, of one or more fluidic devices (including, e.g., fluidic device 100).

In another example, the haptic assembly in FIG. 13 may be configured to instruct haptic glove 1300 to perform specific functions (e.g., based on instructions received from a console such as console 1106 in FIG. 11). In this embodiment, controller 1330 may receive instructions (e.g., via a haptic feedback signal) from console 1106 and actuate haptic glove 1300 according to the instructions via one or more actuators (such as actuator 1320). For example, controller 1330 may instruct actuator 1320 (e.g., via signaling path 1340) to pump fluid into an inflatable bladder to achieve a physical movement restriction. In this example, controller 1330 and/or actuator 1320 may be composed, at least in part, of a group of composable fluidic devices.

Figure 14:
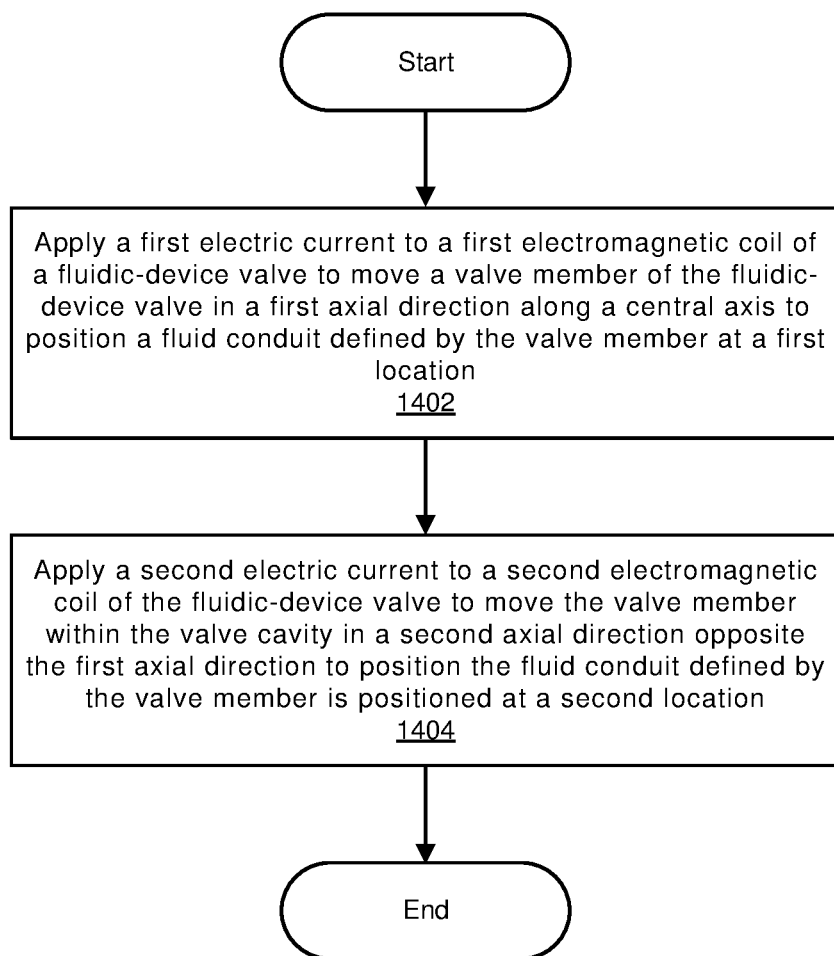
FIG. 14 is a flow diagram of an exemplary method for operating a fluidic-device valve in accordance with some embodiments.

FIG. 14 is a flow diagram of an exemplary method 1400 for operating a fluidic-device valve in accordance with some embodiments. The steps shown in FIG. 14 may be performed by any suitable computer-executable code, computing system, and/or fluidic system, including, for example, fluidic system 152 in FIG. 4.

As illustrated in FIG. 14, at step 1402, one or more of the systems and/or devices described herein may apply a first electric current to a first electromagnetic coil of a fluidic-device valve to move a valve member of the fluidic-device valve in a first axial direction along a central axis to position a fluid conduit defined by the valve member at a first location. For example, valve controller 158 of fluidic system 152 may apply first electric current $I_1$ to first electromagnetic coil 128 of fluidic-device valve 100 to move valve member 122 of fluidic-device valve 100 in first axial direction $D_1$ along central axis 120 to position fluid conduit 150 defined by valve member 122 at first location $L_1$ (see, e.g., FIGS. 1A-3A and 4).

At step 1404, one or more of the systems and/or devices described herein may apply a second electric current to a second electromagnetic coil of the fluidic-device valve to move the valve member within the valve cavity in a second axial direction opposite the first axial direction to position the fluid conduit defined by the valve member is positioned at a second location. For example, valve controller 158 may apply second electric current $I_2$ to second electromagnetic coil 130 of fluidic-device valve 100 to move valve member 122 of fluidic-device valve 100 in second axial direction $D_2$ along central axis 120 to position fluid conduit 150 defined by valve member 122 at second location $L_2$ (see, e.g., FIGS. 3B and 4).

According to at least one embodiment, one or more of the systems and/or devices described herein may (1) apply a first reduced electric current to the first electromagnetic coil of the fluidic-device valve when the fluid conduit defined by the valve member is positioned at the first location, the first reduced electric current being lower than the first electric current, (2) apply a second reduced electric current to the second electromagnetic coil of the fluidic-device valve when the fluid conduit defined by the valve member is positioned at the second location, the second reduced electric current being lower than the second electric current. For example, valve controller 158 may apply a first reduced electric current to first electromagnetic coil 128 of fluidic-device valve 100 when fluid conduit 150 defined by valve member 222 is positioned at first location $L_1$, the first reduced electric current being lower than first electric current $I_1$ (see, e.g., FIGS. 3A and 4). Additionally or alternatively, valve controller 158 may apply a second reduced electric current to second electromagnetic coil 130 of fluidic-device valve 100 when fluid conduit 150 defined by valve member 222 is positioned at first location $L_2$, the second reduced electric current being lower than second electric current $I_2$ (see, e.g., FIGS. 3B and 4). Valve member 222 may be respectively maintained in location $L_1$ or $L_2$ by a corresponding lower electric field generated by first electromagnetic coil 128 or second electromagnetic coil 130. Additionally or alternatively, valve member 222 may be maintained in location $L_1$ or $L_2$ without further application of a current to first electromagnetic coil 128 and/or second electromagnetic coil 130.

Figure 15:
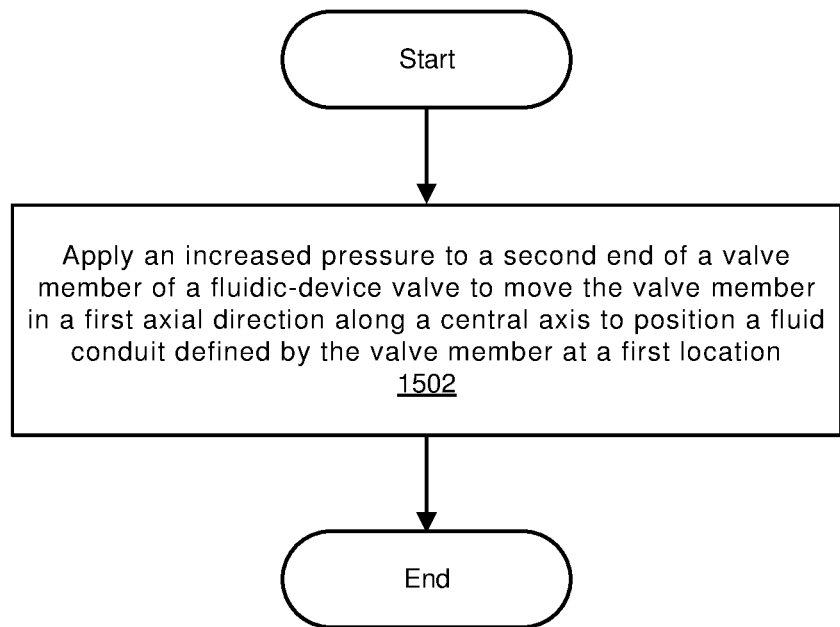
FIG. 15 is a flow diagram of an exemplary method for operating a fluidic-device valve in accordance with some embodiments.

FIG. 15 is a flow diagram of an exemplary method 1500 for operating a fluidic-device valve in accordance with some embodiments. The steps shown in FIG. 15 may be performed by any suitable computer-executable code, computing system, and/or fluidic system, including, for example, fluidic system 252 or fluidic system 452 in FIGS. 6 and 10.

As illustrated in FIG. 15, at step 1502, one or more of the systems and/or devices described herein may apply an increased pressure to a second end of a valve member of a fluidic-device valve to move the valve member in a first axial direction along a central axis to position a fluid conduit defined by the valve member at a first location. For example, gate pressure supply source 270 of fluidic system 252 may apply first elevated pressure $P_1$ to second end 246 of valve member 222 of fluidic-device valve 200 to move valve member 222 in first axial direction $D_1$ along central axis 220 to position fluid conduit 250 defined by valve member 222 at a first location $L_1$ (see, e.g., FIGS. 5A, 6, and 7; see also FIGS. 8A, 9A, 9B, and 10).

In some embodiments, one or more of the systems and/or devices described herein may further apply a reduced pressure to the second end of the valve member of the fluidic-device valve to move the valve member in a second axial direction opposite the first axial direction to position the fluid conduit defined by the valve member at a second location. For example, gate pressure supply source 270 of fluidic system 252 may apply a reduced pressure to second end 246 of valve member 222 of fluidic-device valve 200 to move valve member 222 in second axial direction $D_2$ opposite first axial direction $D_1$ (via, for example, a biasing mechanism 264 as shown in FIG. 5B or an elevated pressure $P_2$ applied as shown in FIG. 9C) to position fluid conduit 250 defined by valve member 222 at second location $L_2$ (see, e.g., FIGS. 5B, 6, and 7; see also FIGS. 5C, 9C, and 10).

As discussed throughout the instant disclosure, the disclosed apparatuses, systems, and methods may provide valves for actuating various fluidic devices, such as fluidic devices that may be used in wearable fabrics and/or systems (e.g., haptic systems). The disclosed fluidic-device valves may be reduced in size and/or weight in comparison to conventional valves, facilitating incorporation of such fluidic-device valves into haptic devices and systems. The fluidic-device valves may be more readily utilized in multiple locations within fluidic circuits while minimizing resistance to flow, fluidic in-line inertia, and action delay and reducing additional costs and complexity. Accordingly, fluidic-device valves described herein may allow for the design of fluidic systems, such as haptic systems, having greater variability and customizability.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A fluidic-device valve comprising:
 a valve guide that comprises a guide wall surrounding a central axis, the guide wall comprising a first guide section, a second guide section, and an interior surface that defines a valve cavity extending longitudinally along the central axis from the first guide section to the second guide section;
 a valve member comprising a ferromagnetic material disposed within the valve cavity, the valve member extending longitudinally along the central axis, the valve member comprising a first plug section and a second plug section and defining a fluid conduit between the first plug section and the second plug section;

a first electromagnetic coil surrounding at least a portion of the first guide section of the guide wall such that the valve member is movable within the valve cavity in a first axial direction along the central axis to position the fluid conduit at a first location by applying a first electric current to the first electromagnetic coil; and a second electromagnetic coil surrounding at least a portion of the second guide section of the guide wall such that the valve member is movable within the valve cavity in a second axial direction opposite the first axial direction to position the fluid conduit at a second location by applying a second electric current to the second electromagnetic coil, wherein:

the valve cavity comprises a first end portion and a second end portion disposed axially opposite the first end portion along the central axis such that the first end portion is separated from the second end portion by the valve member;

the first electromagnetic coil and the second electromagnetic coil are disposed around the guide wall and located between the first and second end portions; and the first end portion is in fluid communication with the second end portion via a coupling passage located outside the valve cavity.

2. The fluidic-device valve of claim 1, wherein:
the first plug section of the valve member abuts the interior surface of the valve guide at the first guide section; and
the second plug section of the valve member abuts the interior surface of the valve guide at the second guide section.

3. The fluidic-device valve of claim 1, wherein:
the guide wall further defines:
  a central opening extending through a portion of the guide wall from the interior surface to an exterior of the guide wall;
  a first branch opening extending through a first additional portion of the guide wall from the interior surface to the exterior of the guide wall; and
  a second branch opening extending through a second additional portion of the guide wall from the interior surface to the exterior of the guide wall;
the central opening is in fluid communication with the first branch opening when the fluid conduit is positioned at the first location; and
the central opening is in fluid communication with the second branch opening when the fluid conduit is positioned at the second location.

4. The fluidic-device valve of claim 3, wherein:
the second plug section of the valve member blocks fluid flow through the second branch opening when the fluid conduit is positioned at the first location; and
the first plug section of the valve member blocks fluid flow through the first branch opening when the fluid conduit is positioned at the second location.

5. The fluidic-device valve of claim 3, wherein a central line, a first branch line, and a second branch line are each coupled to an exterior of the valve guide such that:
the central opening is in fluid communication with the central line;
the first branch opening is in fluid communication with the first branch line; and the second branch opening is in fluid communication with the second branch line.

6. The fluidic-device valve of claim 1, further comprising:
a first flux guide surrounding at least a portion of the first electromagnetic coil; and
a second flux guide surrounding at least a portion of the second electromagnetic coil.

7. The fluidic-device valve of claim 1, wherein:
the application of the first electric current to the first electromagnetic coil produces an electromagnetic field in the valve cavity that is oriented in the first axial direction; and
the application of the second electric current to the second electromagnetic coil produces an electromagnetic field in the valve cavity that is oriented in the second axial direction.

8. The fluidic-device valve of claim 1, wherein:
at least a portion of each of the first plug section and the second plug section of the valve member comprises a substantially cylindrical outer surface; and
at least a portion the guide wall comprises a substantially cylindrical inner surface.

9. The fluidic-device valve of claim 1, wherein the fluid conduit defined by the valve member comprises a circumferential groove surrounding the central axis.

10. A haptic device comprising: a fluidic-device valve comprising: a valve guide that comprises a guide wall surrounding a central axis, the guide wall comprising a first guide section, a second guide section, and an interior surface that defines a valve cavity extending longitudinally along the central axis from the first guide section to the second guide section; a valve member comprising a ferromagnetic material disposed within the valve cavity, the valve member extending longitudinally along the central axis, the valve member comprising a first plug section and a second plug section and defining a fluid conduit between the first plug section and the second plug section; a first electromagnetic coil surrounding at least a portion of the first guide section of the guide wall such that the valve member is movable within the valve cavity in a first axial direction along the central axis to position the fluid conduit at a first location by applying a first electric current to the first electromagnetic coil; and a second electromagnetic coil surrounding at least a portion of the second guide section of the guide wall such that the valve member is movable within the valve cavity in a second axial direction opposite the first axial direction to position the fluid conduit at a second location by applying a second electric current to the second electromagnetic coil; and a fluidic device in fluid communication with the fluidic-device valve via an output line coupled to the fluidic-device valve and the fluidic device, wherein: the valve cavity comprises a first end portion and a second end portion disposed axially opposite the first end portion along the central axis such that the first end portion is separated from the second end portion by the valve member; the first electromagnetic coil and the second electromagnetic coil are disposed around the guide wall and located between the first and second end portions; and the first end portion is in fluid communication with the second end portion via a coupling passage located outside the valve cavity.

11. The haptic device of claim 10, further comprising a controller that: directs application of the first electric current to the first electromagnetic coil; and directs application of the second electric current to the second electromagnetic coil.

12. The haptic device of claim 10, further comprising a pressure supply line and a pressure ground line each coupled to the fluidic-device valve such that: the pressure supply line is in fluid communication with the output line when the fluid conduit defined by the valve member is positioned at the first location; and the pressure ground line is in fluid communication with the output line when the fluid conduit defined by the valve member is positioned at the second location.

13. The haptic device of claim 12, wherein an action of the fluidic device is actuated when the pressure supply line is supplied with a fluid at a pressure and is in fluid communication with the output line.

14. The haptic device of claim 12, wherein an action of the fluidic device is actuated when the pressure ground line is in fluid communication with the output line.

15. A method comprising:
applying a first electric current to a first electromagnetic coil of a fluidic-device valve to move a valve member of the fluidic-device valve in a first axial direction along a central axis to position a fluid conduit defined by the valve member at a first location, the fluidic-device valve comprising:
a valve guide that comprises a guide wall surrounding the central axis, the guide wall comprising a first guide section, a second guide section, and an interior surface that defines a valve cavity extending longitudinally along the central axis from the first guide section to the second guide section;
the valve member movably disposed within the valve cavity, the valve member comprising a ferromagnetic material, the valve member extending longitudinally along the central axis, and the valve member comprising a first plug section and a second plug section and defining the fluid conduit between the first plug section and the second plug section;
the first electromagnetic coil surrounding at least a portion of the first guide section of the guide wall; and
a second electromagnetic coil surrounding at least a portion of the second guide section of the guide wall; and
applying a second electric current to the second electromagnetic coil to move the valve member within the valve cavity in a second axial direction opposite the first axial direction to position the fluid conduit defined by the valve member is positioned at a second location, wherein:
the valve cavity comprises a first end portion and a second end portion disposed axially opposite the first end portion along the central axis such that the first end portion is separated from the second end portion by the valve member;
the first electromagnetic coil and the second electromagnetic coil are disposed around the guide wall and located between the first and second end portions; and
the first end portion is in fluid communication with the second end portion via a coupling passage located outside the valve cavity.

16. The method of claim 15, further comprising at least one of:
applying a first reduced electric current to the first electromagnetic coil of the fluidic-device valve when the fluid conduit defined by the valve member is positioned at the first location, the first reduced electric current being lower than the first electric current; or
applying a second reduced electric current to the second electromagnetic coil of the fluidic-device valve when the fluid conduit defined by the valve member is positioned at the second location, the second reduced electric current being lower than the second electric current.

17. The method of claim 15, wherein a pressure supply line, a pressure ground line, and an output line are each coupled to the fluidic-device valve such that:
the pressure supply line is in fluid communication with the output line when the fluid conduit defined by the valve member is positioned at the first location; and
the pressure ground line is in fluid communication with the output line when the fluid conduit defined by the valve member is positioned at the second location.

* * * * *